US012574423B2

(12) United States Patent
Zhang et al.

(10) Patent No.: US 12,574,423 B2
(45) Date of Patent: Mar. 10, 2026

(54) COMMUNICATION METHOD AND METHOD FOR ESTABLISHING DATA CHANNEL

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xin Zhang, Beijing (CN); Jianping Zheng, Beijing (CN); Di Yan, Beijing (CN); Yue Hu, Beijing (CN); Yakun Pang, Beijing (CN); Ying Li, Beijing (CN); Chen Liu, Beijing (CN); Yali Cai, Beijing (CN); Ji Li, Beijing (CN)

(73) Assignees: Chine Mobile Communication Co., LTD Research Institute, Beijing (CN); China Mobile Communications Group Co., LTD, Beijing (CN)

( * ) Notice: Subject to any disclaimer, the term of this patent is extended or adjusted under 35 U.S.C. 154(b) by 161 days.

(21) Appl. No.: 18/294,829

(22) PCT Filed: Aug. 2, 2022

(86) PCT No.: PCT/CN2022/109714
§ 371 (c)(1),
(2) Date: Feb. 2, 2024

(87) PCT Pub. No.: WO2023/011476
PCT Pub. Date: Feb. 9, 2023

(65) Prior Publication Data
US 2024/0430313 A1 Dec. 26, 2024

(30) Foreign Application Priority Data
Aug. 4, 2021 (CN) ........................ 202110891844.X

(51) Int. Cl.
G06F 13/00 (2006.01)
H04L 65/1016 (2022.01)
H04L 65/1069 (2022.01)

(52) U.S. Cl.
CPC ...... *H04L 65/1069* (2013.01); *H04L 65/1016* (2013.01)

(58) Field of Classification Search
CPC ........... H04L 65/1069; H04L 65/1016; H04W 76/12; H04M 3/493
(Continued)

(56) References Cited

U.S. PATENT DOCUMENTS 12,231,473 B2 * 2/2025 Shen ................... H04L 65/1069
2014/0379931 A1 12/2014 Gaviria
(Continued)

FOREIGN PATENT DOCUMENTS

CN 102082764 A 6/2011
CN 104158985 A 11/2014
(Continued)

OTHER PUBLICATIONS

Office Action for corresponding CN application 202110891844.X, mailed Jan. 19, 2024 (Chinese and English language documents). (34 pages).
(Continued)

*Primary Examiner* — Kenneth R Coulter
(74) *Attorney, Agent, or Firm* — Maginot, Moore & Beck, LLP

(57) ABSTRACT

A communication method is provided. The method includes: monitoring, by a first terminal, a dialing event, triggering a process of establishing a bootstrap data channel with a service platform media module through the dialing event; after the bootstrap data channel with the service platform media module is successfully established, sending, by the
(Continued)

monitoring, by a first terminal, a dialing event, triggering a process of establishing a bootstrap data channel with a service platform media module through the dialing event ⟩— 101 after the bootstrap data channel with the service platform media module is successfully established, sending, by the first terminal, a service request message through the bootstrap data channel ⟩— 102 receiving, by the first terminal, a response message for the service request message returned by the service platform media module, and implementing an interface display and/ or a service logic of a service based on an indication of the response message ⟩— 103 first terminal, a service request message through the bootstrap data channel; and receiving, by the first terminal, a response message for the service request message returned by the service platform media module, and implementing at least one of an interface display or a service logic of a service based on an indication of the response message.

19 Claims, 9 Drawing Sheets

(58) Field of Classification Search
USPC .......................................... 709/227, 228, 224
See application file for complete search history.

(56) References Cited

U.S. PATENT DOCUMENTS

| | | | |
|---|---|---|---|
| 2016/0021519 A1 | 1/2016 | Xu | |
| 2016/0173693 A1 | 6/2016 | Spievak et al. | |
| 2021/0103618 A1 | 4/2021 | Sikora et al. | |
| 2023/0353603 A1* | 11/2023 | Shen | H04L 65/1069 |
| 2023/0353673 A1* | 11/2023 | Shen | H04M 3/493 |

FOREIGN PATENT DOCUMENTS

| | | |
|---|---|---|
| CN | 105227418 A | 1/2016 |
| CN | 112788274 A | 5/2021 |
| CN | 112867068 A | 5/2021 |
| CN | 116636192 A | 8/2023 |
| CN | 116636199 A | 8/2023 |
| DE | 102020129306 A1 | 5/2021 |
| JP | 2010521833 A | 6/2010 |
| JP | 2021508979 A | 3/2021 |
| WO | 2021163684 A1 | 8/2021 |
| WO | 2022147696 A1 | 7/2022 |
| WO | 2022147697 A1 | 7/2022 |

OTHER PUBLICATIONS

Ericsson, LM, Adding Media Feature Tag for IMS Data Channel, 3GPP TSG-SA4 # 109-e, Electronic Meeting, S4-200905, May 20-Jun. 3, 2020. (5 pages).
Huawei, IMS data channel media feature tag in Accept-Contact header, 3GPP TSG-CT WG1 Meeting #130-e, Electronic Meeting, C1-213311, May 20-28, 2021. (9 pages).
Melnyk, Miguel et al., A Cross-Layer Analysis of Session Setup Delay in IP Multimedia Subsystem (IMS) With EV-DO Wireless Transmission, IEEE Transactions on Multimedia, Jun. 2007, pp. 869-881, vol. 9, No. 4. (13 pages).
Samsung Electronics Co., Ltd., MTSI-based architectures and call flows for AR two-party calls, SA4-e (AH) Video SWG post 114-e, S4aV210717, Jun. 22, 2021 (8 pages).
Ericsson, LM, Addition of MTSI Data Channel Media, 3GPP TSG-SA4, Meeting # 107, S4-200087, Wroclaw, Poland, Jan. 20-24, 2020. (16 pages).
Written Opinion for corresponding PCT/CN2022/109714, mailed Nov. 7, 2022. (English language document) (9 pages).
International Search Report for corresponding PCT/CN2022/109714, mailed Nov. 7, 2022. (4 pages) English Language translation attached.
Office Action for corresponding JP application 2024506817, mailed Dec. 6, 2024 (Japanese and English translations) (8 pages).
Office Action for corresponding AU application 2022321707, mailed Nov. 11, 2024 (8 pages).
Huawei, "Proposed architectures for AR conversational services," 3GPP TSG SA4 Meeting #113e, Tdoc S4-210445, Mar. 31, 2021. (11 pages).
ETSI TS 126 114 v16.7.0, Technical Specification, Universal Mobile Telecommunications System (UMTS); LTE: 5G; IP Multimedia Subsystem (IMS); Multimedia telephony; Media handling and interaction, 3GPP TS 26.114 version 16.7.0 Release 16, Oct. 2020. (460 pages).
Office Action for corresponding JP application 2024-506817, mailed Jul. 1, 2025 (Japanese and English translations) (7 pages).

* cited by examiner

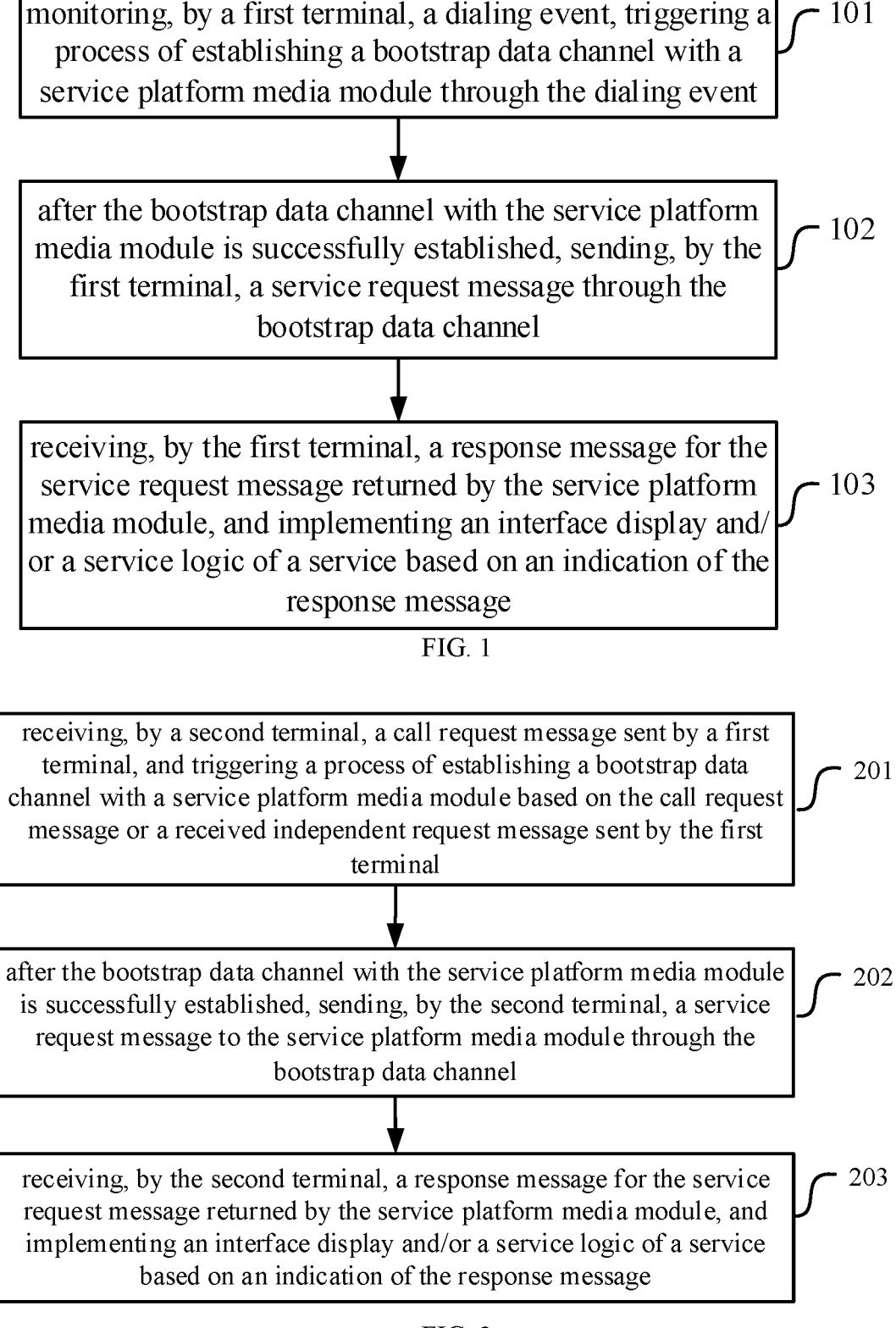

monitoring, by a first terminal, a dialing event, triggering a process of establishing a bootstrap data channel with a service platform media module through the dialing event ⟋ 101 after the bootstrap data channel with the service platform media module is successfully established, sending, by the first terminal, a service request message through the bootstrap data channel ⟋ 102 receiving, by the first terminal, a response message for the service request message returned by the service platform media module, and implementing an interface display and/or a service logic of a service based on an indication of the response message ⟋ 103

FIG. 1 receiving, by a second terminal, a call request message sent by a first terminal, and triggering a process of establishing a bootstrap data channel with a service platform media module based on the call request message or a received independent request message sent by the first terminal ⟋ 201 after the bootstrap data channel with the service platform media module is successfully established, sending, by the second terminal, a service request message to the service platform media module through the bootstrap data channel ⟋ 202 receiving, by the second terminal, a response message for the service request message returned by the service platform media module, and implementing an interface display and/or a service logic of a service based on an indication of the response message ⟋ 203

FIG. 2

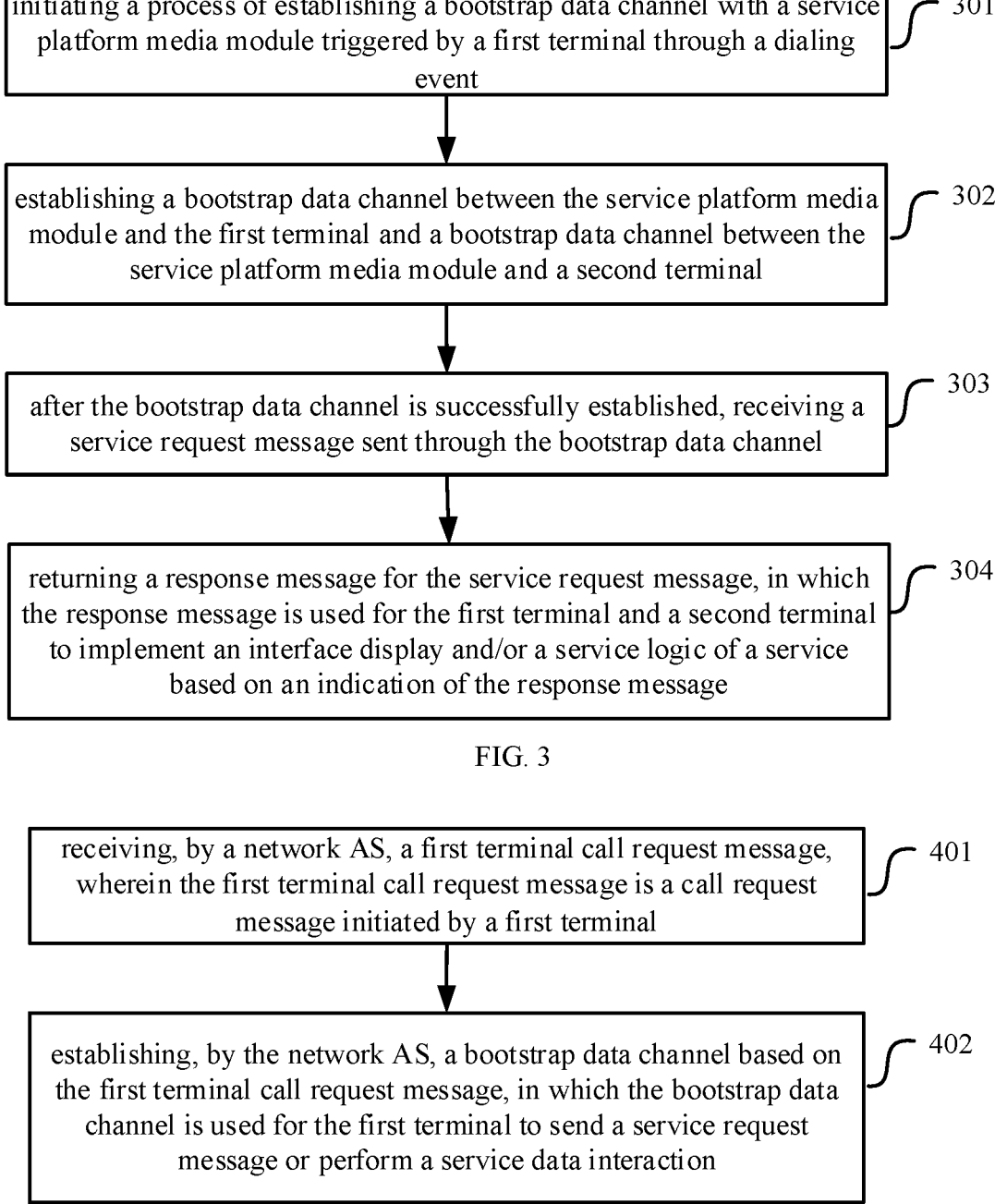

initiating a process of establishing a bootstrap data channel with a service platform media module triggered by a first terminal through a dialing event ⟍ 301 establishing a bootstrap data channel between the service platform media module and the first terminal and a bootstrap data channel between the service platform media module and a second terminal ⟍ 302 after the bootstrap data channel is successfully established, receiving a service request message sent through the bootstrap data channel ⟍ 303 returning a response message for the service request message, in which the response message is used for the first terminal and a second terminal to implement an interface display and/or a service logic of a service based on an indication of the response message ⟍ 304

FIG. 3 receiving, by a network AS, a first terminal call request message, wherein the first terminal call request message is a call request message initiated by a first terminal ⟍ 401 establishing, by the network AS, a bootstrap data channel based on the first terminal call request message, in which the bootstrap data channel is used for the first terminal to send a service request message or perform a service data interaction ⟍ 402

FIG. 4

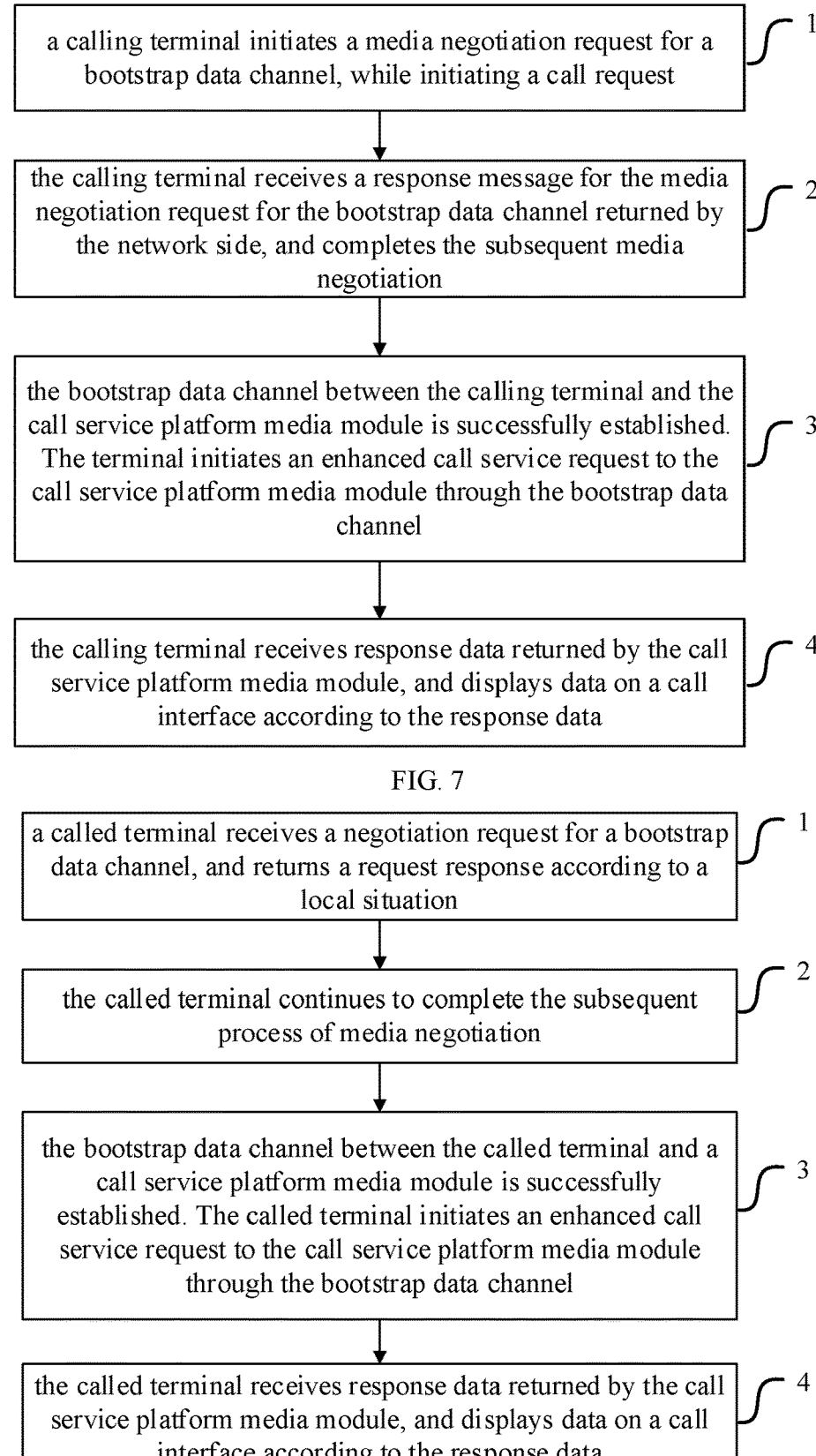

a calling terminal initiates a media negotiation request for a bootstrap data channel, while initiating a call request    1 the calling terminal receives a response message for the media negotiation request for the bootstrap data channel returned by the network side, and completes the subsequent media negotiation    2 the bootstrap data channel between the calling terminal and the call service platform media module is successfully established. The terminal initiates an enhanced call service request to the call service platform media module through the bootstrap data channel    3 the calling terminal receives response data returned by the call service platform media module, and displays data on a call interface according to the response data    4

FIG. 7 a called terminal receives a negotiation request for a bootstrap data channel, and returns a request response according to a local situation    1 the called terminal continues to complete the subsequent process of media negotiation    2 the bootstrap data channel between the called terminal and a call service platform media module is successfully established. The called terminal initiates an enhanced call service request to the call service platform media module through the bootstrap data channel    3 the called terminal receives response data returned by the call service platform media module, and displays data on a call interface according to the response data    4

FIG. 8 a network receives a negotiation request for a bootstrap data channel from a calling terminal 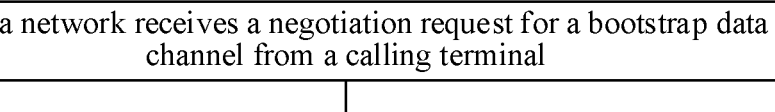 1

(Manner 1) the network caches related media negotiation parameters of the calling terminal and modifies them into related media negotiation parameters of a service platform media module; or, (Manner 2) the network caches related media negotiation parameters for establishing the bootstrap data channel on the calling terminal side and carried in a request for establishing the bootstrap data channel from the calling terminal side and then deletes the related media negotiation parameters, and adds related media information for negotiating the bootstrap data channel on the called terminal side. Media negotiation parameters on the network side carries related media negotiation parameters of the service platform media module — 2 the network forwards a media negotiation request from the calling terminal processed in the previous step to the called terminal — 3 the network receives a response message for the media negotiation request returned by the called terminal, caches media response information returned by the called terminal locally; (Corresponding to the Manner 1) called response information is replaced with a response message sent by the service platform media module for the request for establishing the bootstrap data channel sent by the calling terminal cached in step 2; or (Corresponding Manner 2) the called response information is deleted, and the response message sent by the service platform media module for the request for establishing the bootstrap data channel sent by the calling terminal cached in step 2 is added — 4 the network forwards a media negotiation response from the called terminal processed in the previous step to the calling terminal — 5 the network completes the subsequent process of the media negotiation — 6

FIG. 10

COMMUNICATION METHOD AND METHOD FOR ESTABLISHING DATA CHANNEL

CROSS-REFERENCE TO RELATED APPLICATIONS

This application is a U.S. national phase application of International Application No. PCT/CN2022/109714, filed on Aug. 2, 2022, which is based on and claims priority to Chinese patent application No. 202110891844.X, filed on Aug. 4, 2021, the entire contents of which are incorporated herein by reference.

TECHNICAL FIELD

The present disclosure relates to a field of communication technologies, and particularly to a communication method and a method for establishing a data channel.

BACKGROUND

The related art provides a data channel technology based on an internet protocol multimedia system (IMS) network. How to complete a negotiation of the data channel through a service discovery protocol (SDP) is defined.

SUMMARY

A communication method is provided, including:

monitoring, by a first terminal, a dialing event, triggering a process of establishing a bootstrap data channel with a service platform media module through the dialing event;

after the bootstrap data channel with the service platform media module is successfully established, sending, by the first terminal, a service request message through the bootstrap data channel; and receiving, by the first terminal, a response message for the service request message returned by the service platform media module, and implementing an interface display and/or a service logic of a service based on an indication of the response message.

A communication method is provided, including:

receiving, by a second terminal, a call request message sent by a first terminal, and triggering a process of establishing a bootstrap data channel with a service platform media module based on the call request message or a received independent request message;

after the bootstrap data channel with the service platform media module is successfully established, sending, by the second terminal, a service request message to the service platform media module through the bootstrap data channel; and receiving, by the second terminal, a response message for the service request message returned by the service platform media module, and implementing an interface display and/or a service logic of a service based on an indication of the response message.

A communication method is provided, including:

initiating a process of establishing a bootstrap data channel with a service platform media module triggered by a first terminal through a dialing event;

establishing a bootstrap data channel between the service platform media module and the first terminal and a bootstrap data channel between the service platform media module and a second terminal;

after the bootstrap data channel is successfully established, receiving a service request message sent through the bootstrap data channel; and returning a response message for the service request message, in which the response message is used for the first terminal and the second terminal to implement an interface display and/or a service logic of a service based on an indication of the response message.

BRIEF DESCRIPTION OF THE DRAWINGS

The drawings described herein are used to provide a further understanding of the present disclosure to constitute a part of the present disclosure, and the illustrative embodiments of the present disclosure and the description thereof are used to explain the present disclosure, and do not constitute an incorrect limitation of the present disclosure. In the drawings:

FIG. 1 is a flowchart of a communication method on a calling terminal side according to an embodiment of the present disclosure.

FIG. 2 is a flowchart of a communication method on a called terminal side according to an embodiment of the present disclosure.

FIG. 3 is a flowchart of a communication method on a network side according to an embodiment of the present disclosure.

FIG. 4 is a flowchart of a communication method on an AS side according to an embodiment of the present disclosure.

FIG. 7 is a flowchart of an implementation process on a calling terminal side that a terminal initiates establishment of a bootstrap data channel according to an embodiment of the present disclosure.

FIG. 8 is a flowchart an implementation process on a called terminal side that a terminal initiates establishment of a bootstrap data channel according to an embodiment of the present disclosure.

FIG. 10 is a flowchart of an implementation process on a network side that a terminal initiates establishment of a bootstrap data channel according to an embodiment of the present disclosure.

DETAILED DESCRIPTION

Figure 5:
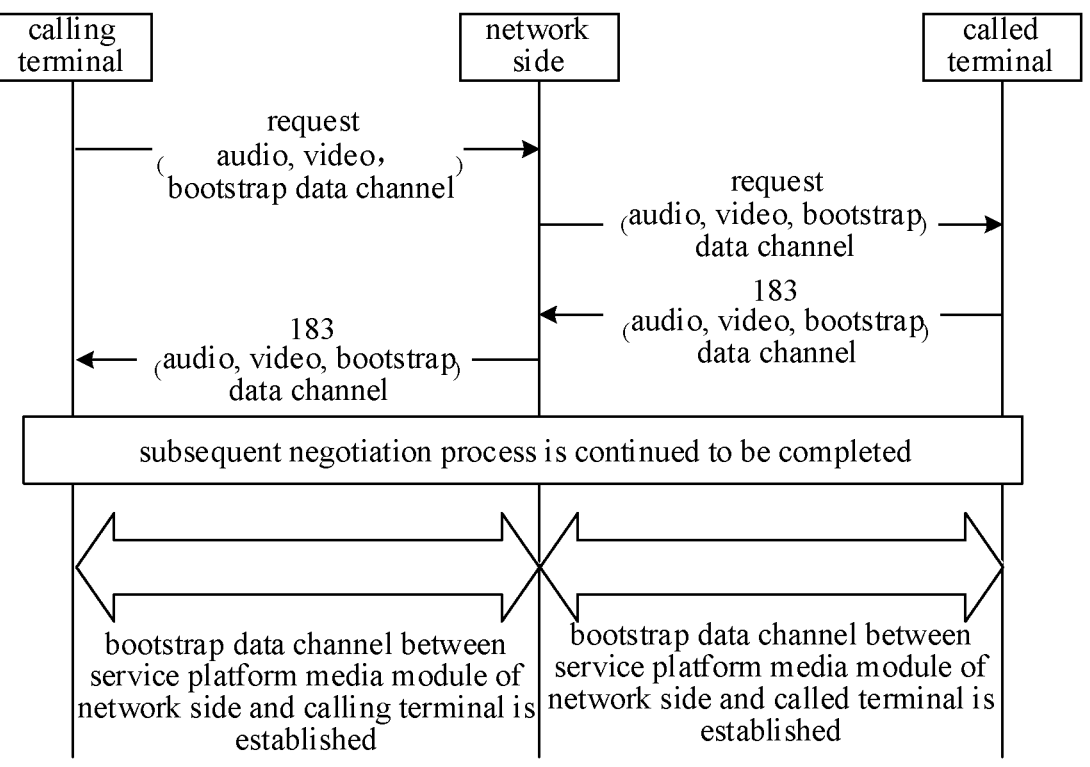
FIG. 5 is a flowchart of a first implementation of a calling terminal initiating a media negotiation request according to an embodiment of the present disclosure.

The inventors find that in the process of the invention: with the influence of internet application and smart terminal large screen on usage habits of users, users, especially young people, always wish to exchange or acquire more information in the process of making a call, and the communication requirements present a multi-dimensional trend. For example, some interesting interactions are desired when a call is made with family and friends, or it is desirable to share a camera or screen for remote guidance when it is difficult in language to guide an elderly to operate. Operators carry out various types of telephone services including a high-definition voice, a value-added-to-call service (such as a smart network and a virtual network (centrex)), a high-definition video call, etc., which always focus on a single voice and video call function, and cannot meet complex communication requirements of the users.

Meanwhile, a call network of the operator only supports transmissions of voice and video data between a calling terminal and a called terminal, and does not support transmission of more types of data. More information interactions cannot be performed between the calling user and the called user.

By an interactive data channel technology, richer types of data may be transmitted in an operator call network VoIMS and a voice over long-term evolution (VoLTE), including text, a webpage, a picture, a video, a position, a file, an interaction menu, an interaction form, and the like.

In addition, the related art also defines a bootstrap data channel, which is also referred to as a BDC, is a type of data channel for transmitting data based on a hypertext transfer protocol (HTTP) protocol, and a data channel for a terminal to request a service from a network side for the first time.

However, the disadvantages related to the related art are that: there is no solution for implementing the end-to-end specific service combined with an operator phone, the condition under which establishment of the bootstrap data channel is triggered has not been specified, and it is not specified how network elements on the network side cooperate with each other to complete negotiation establishment of the bootstrap data channel with the terminal.

Based on this, a solution for establishing an interactive bootstrap data channel in an operator call network VoIMS is provided in the embodiments of the present disclosure. The solution of the interactive bootstrap data channel is that the terminal may obtain richer call applications from the network side, that are provided to the user using a terminal native call APP (i.e., an operator call application provided by the terminal). After the user selects an application, the terminal provides related services for the user through the data channel.

Specific embodiments of the present disclosure are described below with reference to the accompanying drawings.

In the description, the embodiments of the disclosure are described from perspectives of the calling terminal, the called terminal, the service platform media module at the network side and the application server (AS) respectively, and examples of implementations are also given to better understand the implementation of the solutions provided in the embodiments of the present disclosure. Such explanation does not mean that they must be implemented in conjunction, or must be implemented separately. In fact, when they are implemented separately, they also solve their own problems, and when they are used in conjunction, better technical effects can be achieved.

The bootstrap data channel is a type of a data channel defined according to different usage functions. The data channel is a data channel established between a first terminal and a network side platform or a second terminal, the establishment of the data channel is initiated by the first terminal during a call process, and the data channel is configured to transmit service data during the call process. The call process is a process starting from initiating by the first terminal a call request message and ending to an end of a call.

FIG. 1 is a flowchart of a communication method on a calling terminal side. As shown in FIG. 1, the method may include step 101 to step 103.

At step 101, a first terminal monitors a dialing event, and triggers a process of establishing a bootstrap data channel with a service platform media module through the dialing event.

At step 102, after the bootstrap data channel between the first terminal and the service platform media module is successfully established, the first terminal sends a service request message through the bootstrap data channel.

At step 103, the first terminal receives a response message for the service request message returned by the service platform media module, and implements an interface display and/or a service logic of a service according to an indication of the response message.

FIG. 2 is a flowchart of a communication method on a called terminal side, as shown in FIG. 2, the method may include step 201 to step 203.

At step 201, a second terminal receives a call request message sent by a first terminal, the second terminal triggers a process of establishing a bootstrap data channel with a service platform media module based on the call request message or a received independent request message.

At step 202, after the bootstrap data channel with the service platform media module is successfully established, the second terminal sends a service request message to the service platform media module through the bootstrap data channel.

At step 203, the second terminal receives a response message for the service request message returned by the service platform media module, and implements an interface display and/or a service logic of a service according to an indication of the response message.

FIG. 3 is a flowchart of a communication method on a network side, as shown in FIG. 3, the method may include step 301 to step 304.

At step 301, a process of establishing a bootstrap data channel with a service platform media module triggered by a first terminal through a dialing event is initiated.

At step 302, a bootstrap data channel between the service platform media module and the first terminal and a bootstrap data channel between the service platform media module and a second terminal are established.

At step 303, after the bootstrap data channel is successfully established, a service request message sent through the bootstrap data channel is received.

At step 304, a response message for the service request message is returned, the response message is used for the first terminal and the second terminal to implement an interface display and/or a service logic of a service according to an indication of the response message.

For the implementation on the network side, the call request message may be notified by a VoIMS network AS or a VoLTE network AS; or may also be a channel negotiation request received by the service platform media module and sent by the first terminal, that is, the service platform media module directly processes the channel negotiation request initiated by the calling terminal, and initiates the channel negotiation request to the called terminal.

When a service server directly processes a data channel media request, the service server is a certain AS in the VoIMS network or the VoLTE network. When the service server does not directly process the data channel media request, another AS in the VoIMS network or the VoLTE network may replace the first service server to perform a negotiation.

For the case of establishing a data channel in an IMS network, the negotiation work may also be implemented by a certain AS in the VoIMS network or the VoLTE network, such as a VoLTE AS of a current network, or another certain network element specially used for processing a media negotiation in a call.

The service platform media module may be a voice over new radio (VoNR)+media plane, a media function (MF), a media resource function (MRF), or a data channel media function (DCMF), etc.

A service platform media module may also be referred to as a service platform media server due to industry habits, or directly referred to as a service platform, which may refer to functional entities providing services, that can be deployed separately, and can also be deployed as a server. For example, functions may also be implemented by the service platform media module and the service platform. In this case, for example, the service platform may be a network element responsible for processing a media negotiation signaling with the terminal when the service platform media module establishes a data channel or a bootstrap data channel with the terminal.

The embodiment on the network side will be described below.

As for a network AS, it may also be an AS of a VoIMS network or an AS of a VoLTE network, which both refer to functional entities providing services, and may have different names according to different networks, such as VoLTE AS, or another certain network element specially used for processing a media negotiation in a call.

FIG. 4 is a flowchart of a communication method on an AS side. As shown in FIG. 4, the method may include step 401 to step 402.

At step 401, a network AS receives a first terminal call request message, the first terminal call request message is a call request message initiated by a first terminal.

At step 402, the network AS establishes a bootstrap data channel based on the first terminal call request message, the bootstrap data channel is used for the first terminal to send a service request message or perform a service data interaction.

In an implementation, the data channel is a Data Channel (DC) and/or a WebSocket channel.

In order to better understand a service platform media module, the service platform media module may also be referred to as a call service platform media module, etc., and correspondingly, a service performed by the data channel is an enhanced call service.

Specifically, a calling terminal initiates a VoIMS or VoLTE call request, and the calling terminal initiates a media negotiation request of a bootstrap data channel at the same time. In a subsequent media negotiation process of the calling terminal and the called terminal, for the media negotiation request of the bootstrap data channel carried by the calling terminal, the network completes the establishment of a media channel between the calling terminal and an enhanced call control platform in the network. When forwarding the calling request to the called terminal, the network modifies media negotiation request parameters of the bootstrap data channel carried by the calling terminal to media negotiation parameters of an enhanced call platform, including an address, a port and related media negotiation parameters (or deletes media information of the bootstrap data channel carried by the calling terminal, and adds related media negotiation parameters used for negotiating the bootstrap data channel between the enhanced call platform and the called terminal), and completes the establishment of the media channel between the called terminal and the enhanced call control platform in the network.

The bootstrap data channel is a channel between the terminal and the call service platform media module, and is used for the terminal to obtain an enhanced call service that can be used by the terminal from the call service platform media module. The enhanced call service channel is a channel between a terminal and a terminal, or a channel between a terminal and a certain enhanced call service, and may be used for directly performing a service data interaction between the terminal and a peer terminal or a certain enhanced call service platform media module. In order to facilitate a management of the enhanced call service, usage entries or initial interfaces of all the enhanced call services need to be provided to the user through the bootstrap data channel. According to service requirements, the terminal may reestablish an enhanced call service channel to obtain more interaction data.

The present disclosure has the following beneficial effects.

In the technical solutions provided in the embodiments of the present disclosure, a calling terminal initiates the call request, and after the bootstrap data channel between the calling terminal and the service platform media module is successfully established, the calling terminal initiates an interactive data service request to the service platform media module through the bootstrap data channel. The calling terminal receives a response message returned by the service platform media module, and implements the interface display and/or the service logic of the service according to an indication of the response message.

A called terminal receives the call request. After the bootstrap data channel with the service platform media module is successfully established, an interactive data service request is initiated to the service platform media module through the bootstrap data channel. After the response message returned by the service platform media module is received, the interface display and/or the service logic of the service is implemented according to an indication of the response message.

At a network side, after receiving the call request event initiated by the calling terminal, the bootstrap data channel between the service platform media module and the calling terminal and the bootstrap data channel between the service platform media module and the called terminal is established. The response message for the service request message is returned and used for the first terminal and the second terminal to implement the interface display and/or the service logic of the service according to the indication of the response message.

Since a solution for a terminal to establish a bootstrap data channel is provided, a specific implementation solution of the data channel technology and a solution for implementing an end-to-end service combined with an operator phone are provided.

I Implementation of Initiating a Media Negotiation Request

In an implementation, the bootstrap data channel is initiated by the first terminal.

In an implementation, the negotiation request information of the bootstrap data channel is carried by the first terminal in the call request message. The call request message is a call request message initiated to the second terminal by the first terminal after the dialing event is monitored by the first terminal, or is independently sent by the first terminal using an independent message.

Specifically, there are two ways that the calling terminal simultaneously initiates the media negotiation request for the bootstrap data channel, and in order to more clearly reflect a negotiation process on the terminal side, all of the network AS, the VoLTE network AS, the VoIMS network AS or the service platform media module that may participate in the negotiation are abstracted as a network side. The specific implementation will be described as follows.

Way 1: the calling terminal directly carries media negotiation parameters of the bootstrap data channel in a VoIMS call request, that is, a voice/video media negotiation with a VoIMS call is performed in a same session.

FIG. 5 is a flowchart of a first implementation of a calling terminal initiating a media negotiation request. As shown FIG. 5, the method may include the following steps.

The calling terminal sends a request (INVITE) message carrying audio, video and bootstrap data channel negotiation information to the network side.

The network side sends an INVITE message carrying the audio, video and the bootstrap data channel negotiation information to the called terminal.

The called terminal responds with a 183 message carrying the audio, video and the bootstrap data channel negotiation information.

The network side responds with the 183 message carrying the audio, video and the bootstrap data channel negotiation information.

A subsequent negotiation process is continued to be completed.

The network side completes the establishment of the bootstrap data channels between the service platform media module on the network side and the calling and called terminals.

Way 2: the calling terminal may use another request to initiate an establishment request of the bootstrap data channel while initiating the VoIMS call request.

Figure 6:
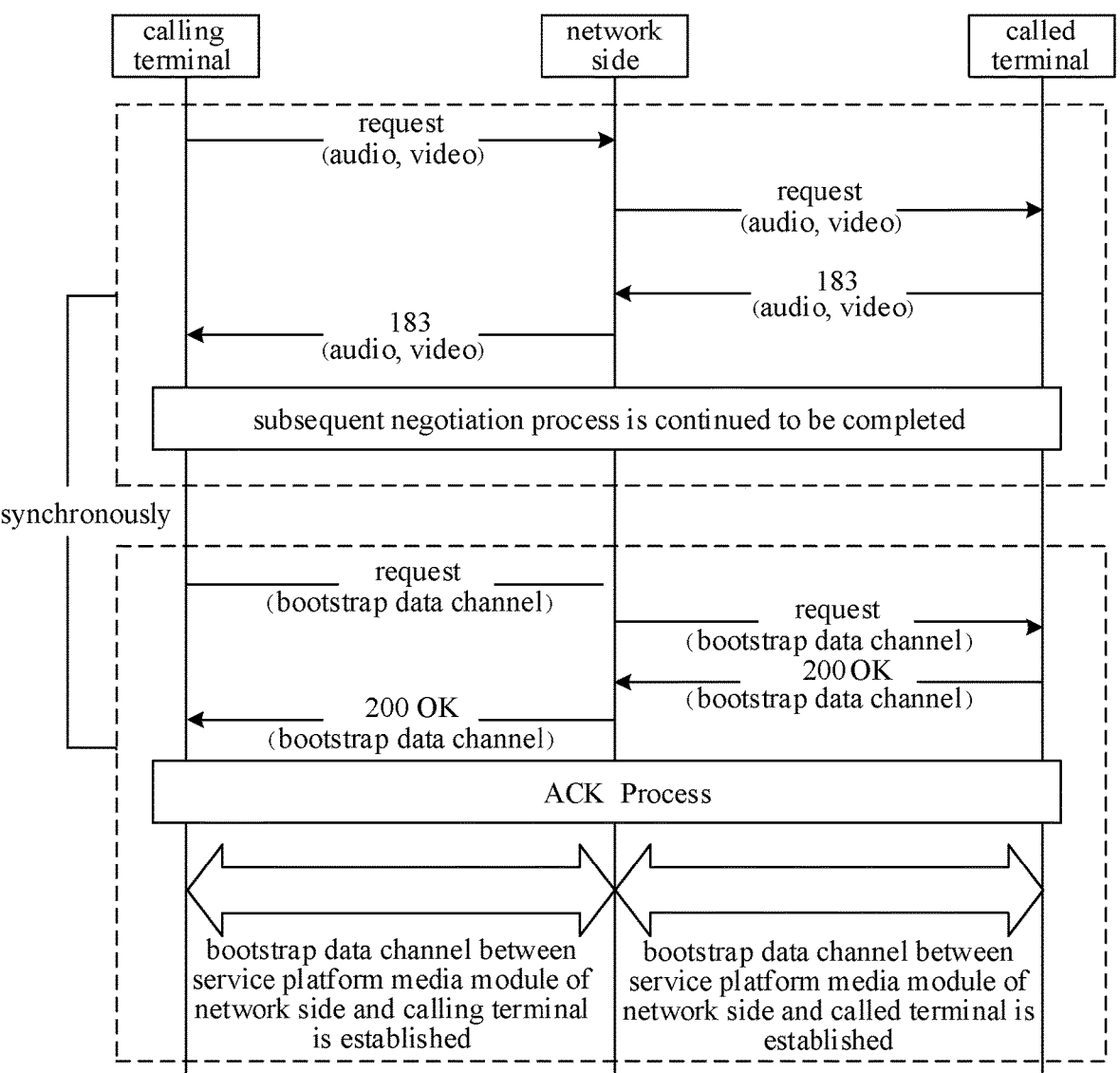
FIG. 6 is a flowchart of a second implementation of a calling terminal initiating a media negotiation request according to an embodiment of the present disclosure.

FIG. 6 is flowchart of a second implementation of a calling terminal initiating a media negotiation request. As shown FIG. 6, the method may include the following steps.
Phase I:

The calling terminal sends an INVITE message carrying audio and video to a network side.

The network side sends the INVITE message carrying the audio and the video to a called terminal.

The called terminal responds with a 183 message carrying the audio and the video.

The network side responds with the 183 message carrying the audio and the video. A subsequent negotiation process is continued to be completed.

The network side completes the establishment of bootstrap data channels between the service platform media module on the network side and the calling and called terminals.
Phase II:

The calling terminal sends an INVITE message carrying bootstrap data channel negotiation information to the network side.

The network side sends the INVITE message carrying the bootstrap data channel negotiation information to the called terminal.

The called terminal responds with a 200 OK message carrying the bootstrap data channel negotiation information.

The network side responds with a 200 OK message carrying the bootstrap data channel negotiation information.

A subsequent negotiation process is continued to be completed.

The network side completes the establishment of bootstrap data channels between the service platform media module on the network side and the calling and called terminals. PHASE I and PHASE II may be implemented in parallel.

II Implementation on the Calling Terminal Side that a Terminal Initiates Establishment of a Bootstrap Data Channel in a VoIMS Call FIG. 7 is a flowchart of an implementation process on the calling terminal side that a terminal initiates the establishment of a bootstrap data channel. As shown in FIG. 7, the process may include the following steps.

The calling terminal initiates a media negotiation request for a bootstrap data channel, while initiating a call request.

The media negotiation request for the enhanced call bootstrap data channel may be negotiated together with a VoIMS audio/video media in a VoIMS call request. Or, the media negotiation request for the bootstrap data channel may be carried in an independent media negotiation request message.

2. The calling terminal receives a response message for the media negotiation request for the bootstrap data channel returned by the network side, and completes the subsequent media negotiation.

3. The data channel between the calling terminal and the call service platform media module is successfully established. The terminal initiates an interactive data service request to the call service platform media module through the bootstrap data channel.

4. The calling terminal receives response data returned by the call service platform media module, and displays data on a call interface according to the response data.

In an implementation, the first terminal establishes the data channel with the service platform media module through the network AS, and/or establishes the bootstrap data channel with the service platform media module through the network AS.

In an implementation, the first terminal establishes the bootstrap data channel with the service platform media module through the VoIMS network AS or the VoLTE network AS; and/or, the first terminal establishes the bootstrap data channel with the service platform media module through the service platform media module.

In an implementation, implementing the interface display and/or the service logic of the service according to the indication of the response message includes:

obtaining service description information from the response message, in which the service description information includes:

bootstrap service description information, in which the first terminal implements an service logic of a bootstrap service according to the bootstrap service description information, and further obtains service application list description information or service application description information; or, the service application list description information, in which the first terminal implements an interface display and/or a service logic of a service application list according to the service application list description information, and further obtains the service application description information according to a selection of the user; or, the service application description information, in which the first terminal implements an interface display and/ or a service logic of a service application based on the service application description information.

III Implementation on the Called Terminal Side that a Terminal Initiates Establishment of a Bootstrap Data Channel in a VoIMS Call FIG. 8 is a flowchart of an implementation process on a called terminal side that a terminal initiates the establishment of a bootstrap data channel. As shown in FIG. 8, the process may include the following steps.

The called terminal receives a negotiation request for a bootstrap data channel, and returns a request response according to a local situation.

The negotiation request for the bootstrap data channel received by the called terminal may be carried by a VoIMS call request message, or may be carried in an independent request message.

2. The called terminal continues to complete the subsequent process of media negotiation.

3. The data channel between the called terminal and the call service platform media module is successfully established. The called terminal initiates an enhanced call service request to the call service platform media module through the bootstrap data channel.

4. The called terminal receives response data returned by the call service platform media module, and displays data on a call interface according to the response data.

In an implementation, the second terminal establishes a data channel with the service platform media module through a network AS, and/or establishes the bootstrap data channel with the service platform media module through the network AS.

In an implementation, the second terminal establishes the bootstrap data channel with the service platform media module through a VoIMS network AS or a VoLTE network AS; and/or, the second terminal establishes the bootstrap data channel with the service platform media module through the service platform media module.

In an implementation, the process may further include the following steps.

The second terminal receives one or a combination of following negotiation parameters of the bootstrap data channel to complete the negotiation for the bootstrap data channel with the second terminal:

a negotiation parameter of the bootstrap data channel carried in the first terminal call request message;

a negotiation parameter of the bootstrap data channel carried in an independent request message sent by the first terminal; and a negotiation parameter of the bootstrap data channel carried by the second terminal in a request message, after the first terminal and the second terminal complete a call initial media negotiation.

In an implementation, implementing the interface display and/or the service logic of the service according to the indication of the response message includes:

obtaining service description information from the response message, in which the service description information includes:

bootstrap service description information, in which the first terminal implements a service logic of a bootstrap service according to the bootstrap service description information, and further obtains service application list description information or service application description information; or, the service application list description information, in which the first terminal implements an interface display and/or a service logic of a service application list according to the service application list description information, and further obtains the service application description information according to a selection of the user; or, the service application description information, in which the first terminal implements an interface display and/or a service logic of a service application according to the application description information.

Specifically, after the bootstrap data channel is established, a response message for the service request message is received through the bootstrap data channel, and the service description information is obtained from the response message. The service description information includes:

bootstrap service description information, in which the first terminal implements a service logic of a bootstrap service according to the bootstrap service description information, and further obtains service application list description information or service application description information; or, the service application list description information, in which the first terminal implements an interface display and/or a service logic of a service application list according to the service application list description information, and further obtains the service application description information according to a selection of the user; or, the service application description information, in which the first terminal implements an interface display and/or a service logic of a service application according to the application description information.

IV Implementation on the Network Side that a Terminal Initiates Establishment of a Bootstrap Data Channel in a VoIMS Call For the implementation on the network side, the call request message may be notified by a VoIMS network AS; or may also be a channel negotiation request received by the service platform media module and sent by the first terminal, that is, the service platform media module directly processes the channel negotiation request initiated by the calling terminal, and initiates the channel negotiation request to the called terminal.

When a service server directly processes a data channel media request, the service server is a certain AS in the VoIMS network (referred to as Solution 1 in the following). When the service server does not directly process the data channel media request, another AS in the VoIMS network may replace the first service server to perform a negotiation (referred to as Solution 2 in the following).

For the case of establishing a data channel in an IMS network, the negotiation work may also be implemented by a certain AS in the VoIMS network, such as a VoLTE AS of a current network, or another certain network element specially used for processing a media negotiation in a call.

Figure 9:
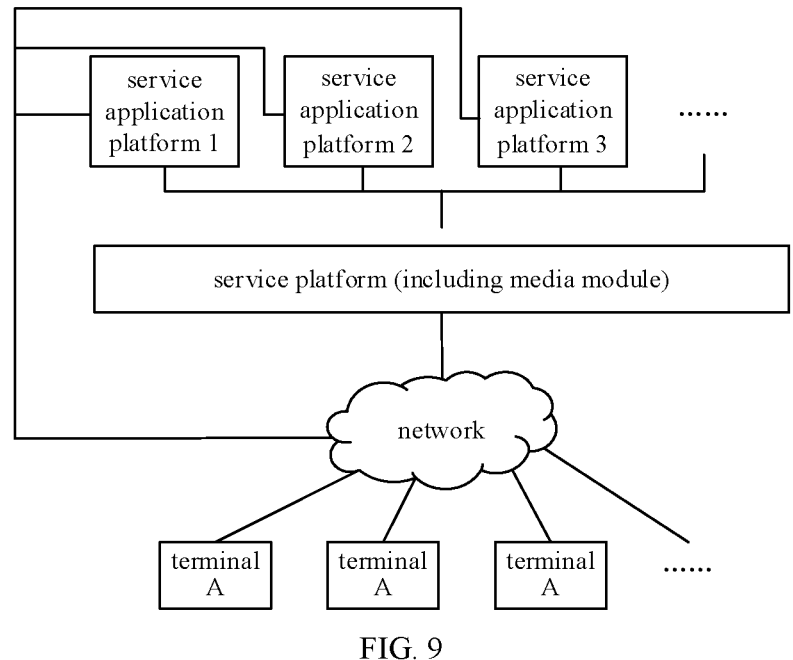
FIG. 9 is a block diagram of a platform system in which a terminal initiates establishment of a bootstrap data channel according to an embodiment of the present disclosure.

FIG. 9 is a block diagram of a platform system in which a terminal initiates establishment of a bootstrap data channel. At least the platform system in the figure may implement the establishment of a bootstrap data channel initiated by the terminal. As shown in FIG. 9, a service platform media module is connected to service application platforms 1, 2, and 3 through a network and a terminal A (in the embodiment, a calling terminal is referred to as a terminal A, a called terminal is referred to as a terminal B). The service application platforms 1, 2, and 3 are connected to the terminal A through the network.

The service platform media module is responsible for access and control of all call enhanced services. Usage entries/initial interfaces of all services need to be provided to a user through the service platform media module.

Solution 1:

In the implementation, it is the service platform media module that initiates the process of establishing the bootstrap data channel with the service platform media module triggered by the first terminal through the dialing event.

The service platform media module establishes the bootstrap data channel with the first terminal, and/or establishes the bootstrap data channel between the service platform media module and the second terminal.

The service platform media module returns a response message corresponding to a media negotiation result of the first terminal and/or a media negotiation result of the second terminal.

In an implementation, the process may further include:

establishing a data channel with the first terminal, and/or establishing a data channel with the second terminal.

In an implementation, the process may further include:

forwarding a response message returned by the second terminal to the first terminal, and modifying media response information of a bootstrap data channel portion in the response message to media response information for the first terminal.

In an implementation, when the first terminal and the second terminal belong to different service platform media modules, the service platform media module forwards a call request initiated by the first terminal to the second terminal through a service platform media module to which the second terminal belongs.

In an implementation, the process may further include:

sending one or a combination of negotiation parameters of the bootstrap data channel to the second terminal to complete a negotiation for the bootstrap data channel with the second terminal, in which the negotiation parameters include:

a negotiation parameter of the bootstrap data channel carried in the first terminal call request message;

a negotiation parameter of the bootstrap data channel carried in an independent request message sent by the first terminal; and a negotiation parameter of the bootstrap data channel carried by the second terminal in a request message, after the first terminal and the second terminal complete a call initial media negotiation.

Solution 2:

In an implementation, it is a network AS that initiates the process of establishing the bootstrap data channel with the service platform media module triggered by the first terminal through the dialing event.

The service platform media module receives a call request event initiated by the first terminal and notified by the network AS.

The bootstrap data channel between the service platform media module and the first terminal is established by the network AS, and/or the bootstrap data channel between the service platform media module and the second terminal is established by the network AS.

The service platform media module returns response information corresponding to the media negotiation result of the first terminal and/or the media negotiation result of the second terminal to the network AS.

In an implementation, the process may further include:

establishing a data channel with the first terminal, and/or establishing a data channel with the second terminal through the network AS.

In an implementation, the service platform media module receives a notification message sent by the network AS. The notification message is sent by a VoIMS network AS or a VoLTE network AS, and used to obtain the negotiation parameters.

In an implementation, the service platform media module returns a response message instructing to implement an interface display and/or a service logic of a service, and obtains service description information from the response message. The service description information includes:

bootstrap service description information, in which the first terminal implements a service logic of a bootstrap service according to the bootstrap service description information, and further obtains service application list description information or service application description information; or, the service application list description information, in which the first terminal implements an interface display and/or a service logic of a service application list according to the service application list description information, and further obtains the service application description information according to a selection of the user; or, the service application description information, in which the first terminal implements an interface display and/or a service logic of a service application according to the application description information.

Correspondingly, in the Solution 2, there is the process on a network AS side.

In an implementation, the process may further include:

the network AS forwarding the response message returned by the second terminal to the first terminal, and modifying the media response information of the bootstrap data channel portion in the response message to the media response information for the first terminal returned by the service platform media module.

In an implementation, when the first terminal and the second terminal belong to different ASs, the network AS forwards the call request initiated by the first terminal to the second terminal through the network AS to which the second terminal belongs.

In an implementation, the process may further include:

sending one or a combination of negotiation parameters of the bootstrap data channel to the second terminal to complete a negotiation for the bootstrap data channel with the second terminal, in which the negotiation parameters include:

a negotiation parameter of the bootstrap data channel carried in the first terminal call request message;

a negotiation parameter of the bootstrap data channel carried in an independent request message sent by the first terminal; and a negotiation parameter of the bootstrap data channel carried by the second terminal in a request message, after the first terminal and the second terminal complete a call initial media negotiation.

In an implementation, the network AS is an AS of a VoIMS network or an AS of a VoLTE network.

FIG. 10 is a flowchart of an implementation process on a network side that a terminal initiates establishment of a bootstrap data channel. As shown in FIG. 10, the process may include the following steps.

A network receives a negotiation request for a bootstrap data channel from a calling terminal.

Manner 1: the network caches related media negotiation parameters of the calling terminal and modifies them into related media negotiation parameters of a service platform media module.

Manner 2: the network caches related media negotiation parameters for establishing the bootstrap data channel on the calling terminal side and carried in a request for establishing the bootstrap data channel from the calling terminal and then deletes the related media negotiation parameters, and adds related media information for negotiating the bootstrap data channel on the called terminal side. Media negotiation parameters on the network side carries related media negotiation parameters of the service platform media module.

3. The network forwards a media negotiation request from the calling terminal processed in the previous step to the called terminal.

4. The network receives a response message for the media negotiation request returned by the called terminal, caches media response information returned by the called terminal locally, and then corresponds to the foregoing Manner 1 and Manner 2 as follows.

Corresponding to the Manner 1, called response information is replaced with a response message sent by the service platform media module for the request for establishing the bootstrap data channel sent by the calling terminal cached in step 2.

Corresponding to the Manner 2, called response information is deleted, and a response message sent by the service platform media module for the request for establishing the bootstrap data channel sent by the calling terminal cached in step 2 is added.

5. The network forwards a media negotiation response from the called terminal processed in the previous step to the calling terminal.

6. The network completes the subsequent process of the media negotiation.

V Implementation of Data Channel Capability Tag

In an implementation, for the calling terminal, the method may further include:

when a call request is initiated, carrying a data channel capability tag to indicate that the first terminal is a terminal with a capability to communicate through a data channel.

In an implementation, the method may further include:

when performing a registration, the first terminal carrying the data channel capability tag to indicate that the first terminal is a terminal with the capability to communicate through the data channel.

In an implementation, for the called terminal, the method may further include:

when the call request is responded, carrying the data channel capability tag to indicate that the second terminal is a terminal with the capability to communicate through the data channel.

In an implementation, the method may further include:

when performing a registration, the second terminal carrying the data channel capability tag to indicate that the second terminal is a terminal with the capability to communicate through the data channel.

In an implementation, for the service platform media module on the network side, if the data channel capability tag is carried when the second terminal performs the registration, the method may further include:

forwarding the call request initiated by the first terminal to the second terminal, in which media negotiation parameters for the second terminal carried in the call request or an independent message are used as the media negotiation parameters of the bootstrap data channel.

In an implementation, if the data channel capability tag is not carried when the second terminal performs the registration, the method may further include:

forwarding the call request message initiated by the first terminal to the second terminal, and deleting the media negotiation parameters of the bootstrap data channel.

In an implementation, the method further includes:

modifying the media response information of the bootstrap data channel portion in the response message returned by the second terminal to the media response information for the first terminal, and forwarding the modified response message returned by the second terminal to the first terminal.

In an implementation, for the network AS on the network side, if the data channel capability tag is carried when the second terminal performs the registration, the method further includes:

the network AS forwarding the call request initiated by the first terminal to the second terminal, and carrying the data channel capability tag to indicate that the second terminal is a terminal with the capability to communicate through the data channel, and the media negotiation parameters for the second terminal returned by the service platform media module and used as the media negotiation parameters of the bootstrap data channel.

In an implementation, if the second terminal does not carry the data channel capability tag when the second terminal performs the registration, the method further includes:

the network AS forwarding the call request message initiated by the first terminal to the second terminal, and deleting the media negotiation parameters of the bootstrap data channel.

Specifically, in order to be compatible with the terminal that does not support an enhanced call service capability in the existing network, the terminal supporting an enhanced call service needs to perform the registration of the enhanced call service capability. When receiving a call request containing an enhanced call service attribute from the calling terminal, the network determines whether the called terminal is registered with the enhanced call service capability. If the called terminal is registered, related media negotiation parameters of the enhanced call service are carried when the network forwards the call request to the called terminal. Finally, the network establishes enhanced call service channels with the calling terminal and the called terminal, respectively. Otherwise, the related parameters are not carried when the network forwards the call request to the called terminal, and the network only establishes an enhanced call service channel with the calling terminal.

The enhanced call service capability may be registered together with the VoIMS call, or may be registered separately.

In an implementation, the method further includes:

modifying the media response information of the bootstrap data channel portion in the response message returned by the second terminal to the media response information for the first terminal, and forwarding the modified response message returned by the second terminal to the first terminal.

VI Implementation for the Case that the Calling and Called Terminals Belong to Different Networks In an implementation, when the first terminal and the second terminal belong to different service platform media modules, the service platform media module forwards the call request initiated by the first terminal to the second terminal through the service platform media module to which the second terminal belongs.

In an implementation, when the first terminal and the second terminal belong to different ASs, the network AS forwards the call request initiated by the first terminal to the second terminal through the network AS to which the second terminal belongs.

Specifically, when the calling and called terminals belong to different networks, there may be a case where providers of the enhanced call service are different. In order to ensure service consistency, the calling and called terminals need to establish bootstrap data channels with a local network and a peer network, respectively. That is, the calling terminal initiates a VoIMS call, and when the call request carries media negotiation parameters of an audio/video channel, the calling terminal carries media negotiation parameters of a bootstrap data channel of the local network and media negotiation parameters of a bootstrap data channel of the remote network.

For different types of bootstrap channels, different serial numbers can be defined for distinguishing, and attribute values are carried for distinguishing when the media negotiation is performed. If a serial number of the bootstrap data channel of the local network may be fixedly defined as 1, a serial number of the bootstrap data channel of the remote network may be fixedly defined as 2, and when other enhanced call service channels are negotiated subsequently, other serial numbers need to be used.

In this case, the network needs to complete the following processing in a negotiation process of the bootstrap data channel.

After receiving a media negotiation request message of the bootstrap data channel, a calling network needs to process the media negotiation parameters in the request message as follows: (1) caching related media negotiation parameters of the bootstrap data channel of the local network, and deleting the related media negotiation parameters of the bootstrap data channel of the local network from an initial call request message; (2) adding a "calling terminal" mark to the related negotiation information for the bootstrap data channel of the remote network carried by the calling terminal; and (3) adding the related media negotiation information of the bootstrap data channel of the remote network, in which the address, the port and related media negotiation parameter number are filled according to related information of the service platform media module in the calling network, and a "called terminal" mark is added. Then, it is forwarded to a called network.

After receiving the media negotiation request message of the bootstrap data channel, the called network needs to process the media negotiation parameters in the request message as follows: (1) adding the related media negotiation parameters of the bootstrap data channel of the local network, in which the address, the port and the related media negotiation parameter number are filled according to the related information of a call service platform media module in the called network; (2) caching the related negotiation information of the bootstrap data channel of the remote network carrying the "calling terminal" mark, and deleting the related negotiation information of the bootstrap data channel of the remote network carrying the "calling terminal" mark from the initial call request message. Then, it is forwarded to the called terminal.

After receiving a response message for an initial media negotiation request from the called terminal, the called network needs to process media negotiation parameters in the response message as follows: (1) deleting the related media negotiation parameters of the bootstrap data channel of the local network; and (2) re-adding the related negotiation information of the bootstrap data channel of the remote network carrying the "calling terminal" mark that is deleted in above step 2, and completing a response processing of related media information according to a condition of the call service platform media module in the called network. Then, it is forwarded to the calling network.

After receiving the response message for the initial media negotiation request from the called terminal forwarded by the called network, the calling network needs to process the media negotiation parameters in the response message as follows: (1) deleting the related negotiation information of the bootstrap data channel of the remote network carrying the "calling terminal" mark; and (2) re-adding the related media negotiation parameters of the bootstrap data channel of the local network that are deleted in above step 1, and completing the response processing of the related media information according to a condition of the call service platform media module in the calling network. Then, it is forwarded to the calling terminal.

VII Implementation for the Case of Interacting Data

In an implementation, implementing the interface display and/or the service logic of the service according to the indication of the response message includes:

obtaining service description information from the response message, in which the service description information includes:

bootstrap service description information, in which the first terminal implements a service logic of a bootstrap service according to the bootstrap service description information, and further obtains service application list description information or service application description information; or, the service application list description information, in which the first terminal implements an interface display and/or a service logic of a service application list according to the service application list description information, and further obtains the service application description information according to a selection of the user; or, the service application description information, in which the first terminal implements an interface display and/or a service logic of a service application according to the application description information.

Specifically, when a certain enhanced call service requires establishment of a point-to-point channel between a terminal and a peer terminal to directly interact data, the terminal initiates an end-to-end channel establishment request according to operation indications of a bootstrap channel.

Based on a same inventive concept, the embodiments of the present disclosure further provide a calling terminal, a called terminal, a service platform media module, an AS, and a computer-readable storage medium. Since the principles of these devices to solve the problems are similar to those of the communication method and the method for establishing a data channel, the implementations of these devices may refer to the implementations of the methods, and details are not described herein again.

Figure 11:
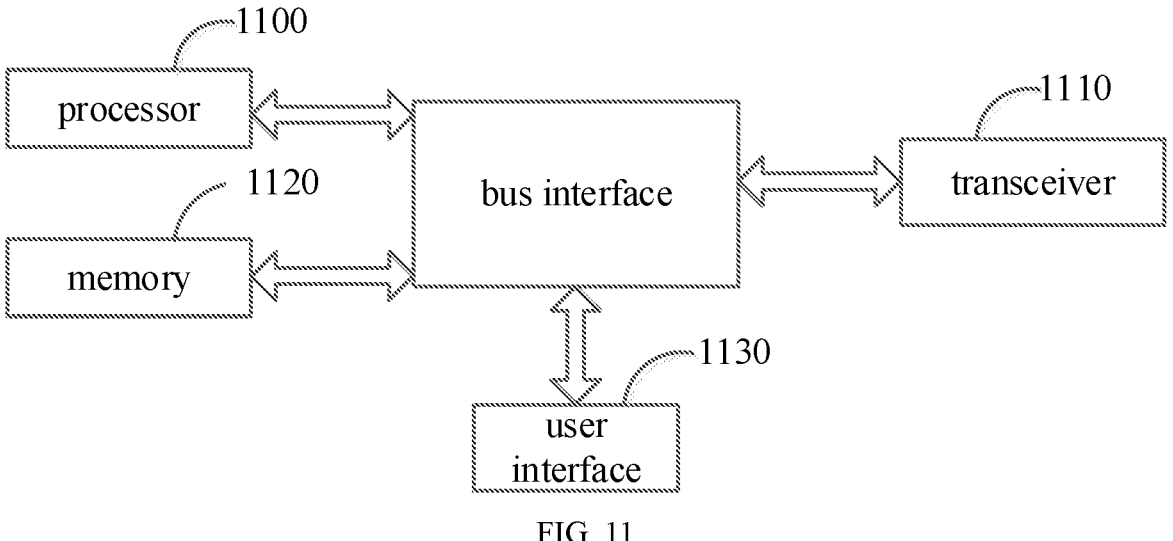
FIG. 11 is a block diagram of a first terminal according to an embodiment of the present disclosure.

FIG. 11 is a block diagram of a first terminal. As shown in FIG. 11, the first terminal includes a processor 1100, a transceiver 1110 and a memory 1120.

The processor 1100 is configured to read a program in the memory 1120 and perform a method including:

monitoring a dialing event, and triggering a process of establishing a bootstrap data channel with a service platform media module through the dialing event;

after the bootstrap data channel with the service platform media module is successfully established, sending a service request message through the bootstrap data channel; and receiving a response message for the service request message returned by the service platform media module, and implementing an interface display and/or a service logic of a service based on an indication of the response message;

The transceiver 1110 is configured to send and receive data under a control of the processor 1100.

In an implementation, establishment of the bootstrap data channel is initiated by the first terminal.

In an implementation, negotiation request message of the bootstrap data channel is carried by the first terminal in the call request message. The call request message is initiated to the second terminal by the first terminal after the dialing event is monitored by the first terminal, or is independently sent by the first terminal using an independent message.

In an implementation, the method further includes:

when a call request is initiated, carrying a data channel capability tag to indicate that the first terminal is a terminal with a capability to communicate through a data channel.

In an implementation, the method further includes:

when performing a registration, carrying the data channel capability tag to indicate that the first terminal is a terminal with the capability to communicate through the data channel.

In an implementation, a data channel with the service platform media module is established through a network AS, and/or the bootstrap data channel with the service platform media module is established through the network AS.

In an implementation, the bootstrap data channel with the service platform media module is established through a VoIMS network AS or a VoLTE network AS;

and/or, the bootstrap data channel with the service platform media module is established through the service platform media module.

In an implementation, the data channel is a Data Channel and/or a WebSocket channel.

In an implementation, implementing the interface display and/or the service logic of the service based on the indication of the response message includes:

obtaining service description information from the response message, in which the service description information includes:

bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of the user; or, the service application description information, in which the first terminal implements an interface display and/ or a service logic of a service application based on the application description information.

In FIG. 11, a bus architecture may include any number of interconnected buses and bridges, which are specifically linked together by one or more processors represented by the processor 1100 and various circuits of a memory represented by the memory 1120. The bus architecture may also link together various other circuits, such as a peripheral device, a voltage regulator, and a power management circuit, etc., which are well known in the art, and therefore are not further described herein. A bus interface provides an interface. The transceiver 1110 may be more than one element, i.e., includes a transmitter and a receiver, and provides units for communicating with other various devices on a transmission medium. For different user equipment, user interface 1130 may also be an interface that may be externally or internally connected to a required device. Connected device includes, but is not limited to, a keypad, a display, a speaker, a microphone, a joystick, and the like.

The processor 1100 is responsible for managing the bus architecture and general processing. The memory 1120 may store data used by the processor 1100 when performing operations.

A first terminal is provided in the embodiments of the present disclosure. The first terminal includes:

a calling module of the first terminal, configured to monitor a dialing event, and trigger a process of establishing a bootstrap data channel with a service platform media module through the dialing event;

a requesting module of the first terminal, configured to send a service request message through the bootstrap data channel after the bootstrap data channel between the first terminal and the service platform media module is successfully established;

a displaying module of the first terminal, configured to receive a response message for the service request message returned by the service platform media module, and indicate to implement an interface display and/or service logic of a service based on an indication of the response message.

In an implementation, the bootstrap data channel is initiated by the first terminal.

In an implementation, the negotiation request message of the bootstrap data channel is carried by the first terminal in the call request message. The call request message is initiated to the second terminal by the first terminal after the dialing event is monitored by the first terminal, or is independently sent by the first terminal using an independent message.

In an implementation, the call module of the first terminal is further configured to carry a data channel capability tag when initiating a call request, to indicate that the first terminal is a terminal with a capability to communicate through the data channel.

In an implementation, the first terminal further includes:

a registering module of the first terminal, configured to carry a data channel capability tag when a registration is performed, to indicate that the first terminal is a terminal with a capability to communicate through the data channel.

In an implementation, the requesting module of the first terminal is further configured to establish a data channel with the service platform media module through a network AS, and/or establish the bootstrap data channel with the service platform media module through the network AS.

In an implementation, the requesting module of the first terminal is further configured to establish the bootstrap data channel with the service platform media module through the VoIMS network AS or the VoLTE network AS.

and/or, establish the bootstrap data channel with the service platform media module through the service platform media module.

In an implementation, the data channel is a Data Channel and/or a WebSocket channel.

In an implementation, the displaying module of the first terminal is further configured to implement the interface display and/or the service logic of the service based on the indication of the response message by performing the following:

obtaining service description information from the response message, in which the service description information includes:

bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of the user; or, the service application description information, in which the first terminal implements an interface display and/or a service logic of a service application based on the application description information.

For convenience of description, each part of the first terminal described above is divided into various modules or units for description. The functions of the modules or units may be implemented in a same or multiple software or hardware when implementing the present disclosure.

Figure 12:
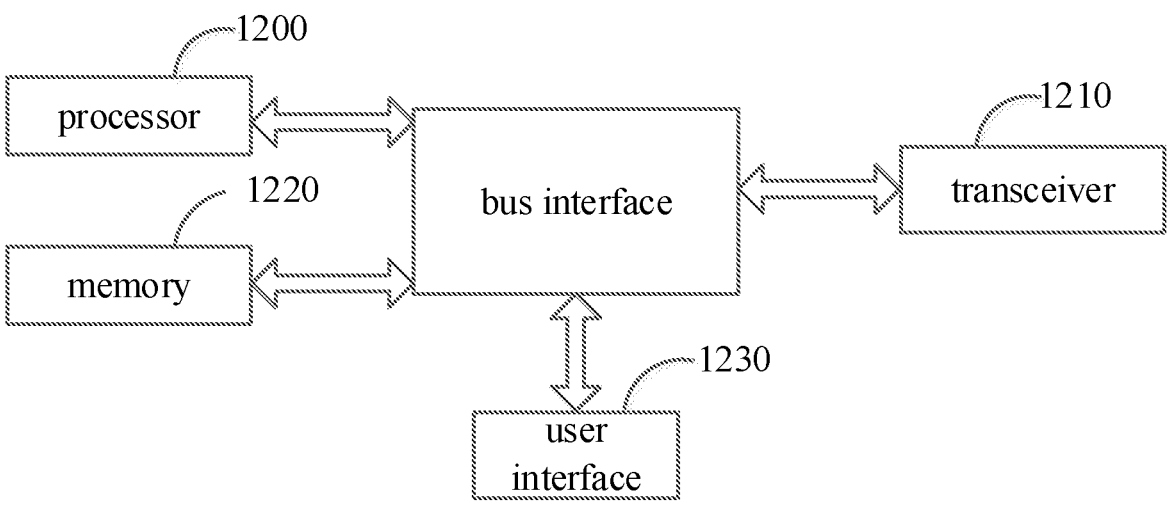
FIG. 12 is a block diagram of a second terminal according to an embodiment of the present disclosure.

FIG. 12 is a block diagram of a second terminal, as shown in FIG. 12, the second terminal includes a processor 1200 and a transceiver 1210.

The processor 1200 is configured to read a program in the memory 1220 and perform a method including:

receiving a call request message sent by a first terminal, and the second terminal triggering a process of establishing a bootstrap data channel with a service platform media module through the call request message or a received independent request message;

after the bootstrap data channel with the service platform media module is successfully established, sending a service request message to the service platform media module through the bootstrap data channel; and receiving a response message for the service request message returned by the service platform media module, and implementing an interface display and/or a service logic of a service based on an indication of the response message;

The transceiver 1210 is configured to send and receive data under a control of the processor 1200.

In an implementation, the first terminal further includes:

carrying a data channel capability tag when performing a registration, to indicate that the second terminal is a terminal with a capability to communicate through a data channel.

In an implementation, a data channel with the service platform media module is established through a network AS, and/or the bootstrap data channel with the service platform media module is established through the network AS.

In an implementation, the bootstrap data channel with the service platform media module is established through a VoIMS network AS or a VoLTE network AS;

and/or, establish the bootstrap data channel with the service platform media module through the service platform media module.

In an implementation, the method further includes:

receiving one or a combination of negotiation parameters of the bootstrap data channel to complete a negotiation for the bootstrap data channel with the second terminal; in which the negotiation parameters include:

a negotiation parameter of the bootstrap data channel carried in a first terminal call request message;

a negotiation parameter of the bootstrap data channel carried in an independent request message sent by the first terminal; and a negotiation parameter of the bootstrap data channel carried by the second terminal in a request message, after the first terminal and the second terminal complete a call initial media negotiation.

In an implementation, implementing the interface display and/or the service logic of the service based on the indication of the response message includes:

obtaining service description information from the response message, in which the service description information includes:

bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of the user; or, the service application description information, in which the first terminal implements an interface display and/or a service logic of a service application based on the application description information.

In an implementation, the data channel is a Data Channel and/or a WebSocket channel.

In FIG. 12, a bus architecture may include any number of interconnected buses and bridges, which are specifically linked together by one or more processors represented by the processor 1200 and various circuits of a memory represented by the memory 1220. The bus architecture may also link together various other circuits, such as a peripheral device, a voltage regulator, and a power management circuit, etc., which are well known in the art, and therefore are not further described herein. A bus interface provides an interface. The transceiver 1210 may be more than one element, i.e., includes a transmitter and a receiver, and provides units for communicating with other various devices on a transmission medium. For different user equipment, user interface 1230 may also be an interface that may be externally or internally connected to a required device. Connected device includes, but is not limited to, a keypad, a display, a speaker, a microphone, a joystick, and the like.

The processor 1200 is responsible for managing the bus architecture and general processing. The memory 1220 may store data used by the processor 1200 when performing operations.

A second terminal is provided in the embodiments of the present disclosure, including:

> a receiving module of the second terminal, configured to receive a call request message sent by a first terminal, and trigger a process of establishing a bootstrap data channel with a service platform media module through the call request message or a received independent request message;
>
> a requesting module of the second terminal, configured to send a service request message to the service platform media module through the bootstrap data channel after the bootstrap data channel with the service platform media module is successfully established;
>
> a displaying module of the second terminal, configured to receive a response message for the service request message returned by the service platform media module, and implement an interface display and/or a service logic of a service based on an indication of the response message.

In an implementation, the second terminal further includes:

> a registering module of the second terminal, configured to carry a data channel capability tag when performing a registration, to indicate that the second terminal is a terminal with a capability to communicate through the data channel.

In an implementation, the requesting module of the second terminal is further configured to establish the data channel with the service platform media module through a network AS, and/or establish the bootstrap data channel with the service platform media module through the network AS.

In an implementation, the requesting module of the second terminal is further configured to establish the bootstrap data channel with the service platform media module through a VoIMS network AS or a VoLTE network AS;

> and/or,
>
> establish the bootstrap data channel with the service platform media module through the service platform media module.

In an implementation, the receiving module of the second terminal is further configured to receive one or a combination of negotiation parameters of the bootstrap data channel to complete a negotiation for the bootstrap data channel with the second terminal; in which the negotiation parameters include:

> a negotiation parameter of the bootstrap data channel carried in a first terminal call request message;
>
> a negotiation parameter of the bootstrap data channel carried in an independent request message sent by the first terminal; and
>
> a negotiation parameter of the bootstrap data channel carried by the second terminal in a request message, after the first terminal and the second terminal complete a call initial media negotiation.

In an implementation, the displaying module of the second terminal is further configured to implement the interface display and/or the service logic of the service based on the indication of the response message by performing the following:

> obtaining service description information from the response message, in which the service description information includes:
>
> bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of a user; or, the service application description information, in which the first terminal implements an interface display and/or a service logic of a service application based on the application description information.

In an implementation, the data channel is a Data Channel and/or a WebSocket channel.

For convenience of description, each part of the second terminal described above is divided into various modules or units for description. The functions of the modules or units may be implemented in a same or multiple software or hardware when implementing the present disclosure.

When implementing the technical solutions provided in the embodiments of the present disclosure, the following may be implemented.

Figure 13:
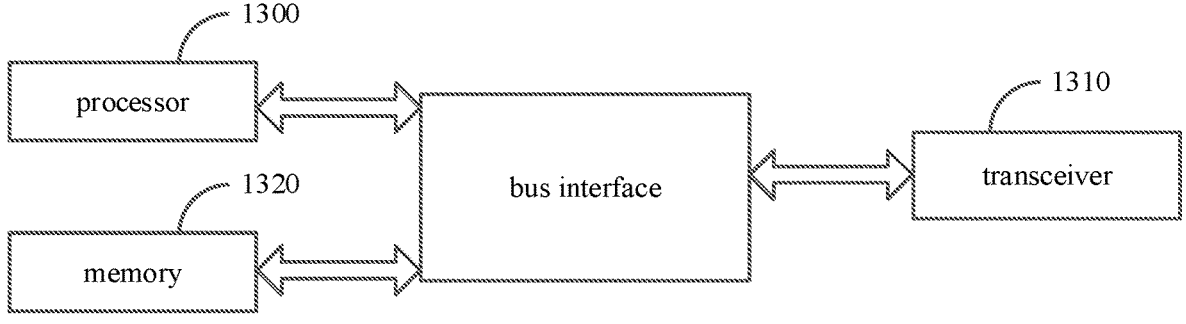
FIG. 13 is a block diagram of a service platform media module according to an embodiment of the present disclosure.

FIG. 13 is a block diagram of a service platform media module. As shown in FIG. 13, the service platform media module includes a processor 1300, a transceiver 1310 and a memory 1320.

The processor 1300 is configured to read a program in the memory 1320 and perform a method including:

> initiating a process of establishing a bootstrap data channel with a service platform media module triggered by a first terminal through a dialing event;
>
> establishing a bootstrap data channel between the service platform media module and the first terminal and a bootstrap data channel between the service platform media module and a second terminal;
>
> after the bootstrap data channel is successfully established, receiving a service request message sent through the bootstrap data channel;
>
> returning a response message for the service request message, in which the response message is used for the first terminal and the second terminal to implement an interface display and/or a service logic of a service based on an indication of the response message.

The transceiver 1310 is configured to send and receive data under a control of the processor 1300.

In the implementation, the service platform media module initiates the process of establishing the bootstrap data channel with the service platform media module triggered by the first terminal through the dialing event.

The bootstrap data channel with the first terminal and the bootstrap data channel between the service platform media module and the second terminal are established.

A response message corresponding to a media negotiation result of the first terminal and/or a media negotiation result of the second terminal is returned.

In an implementation, the method further includes:

> establishing a data channel with the first terminal and/or a data channel with the second terminal.

In an implementation, if the second terminal carries a data channel capability tag when the second terminal performs a registration, the method further includes:

> forwarding a call request message initiated by the first terminal to the second terminal, in which media negotiation parameters for the second terminal carried in the call request or an independent message are used as media negotiation parameters of the bootstrap data channel.

In an implementation, if the second terminal does not carry a data channel capability tag when the second terminal performs the registration, the method further includes:

forwarding a call request message initiated by the first terminal to the second terminal, and deleting media negotiation parameters of the bootstrap data channel.

In an implementation, the method further includes:

modifying media response information of a bootstrap data channel portion in a response message returned by the second terminal to media response information for the first terminal, and forwarding a modified response message returned by the second terminal to the first terminal.

In an implementation, the method further includes:

forwarding the response message returned by the second terminal to the first terminal, and modifying media negotiation parameters of the bootstrap data channel portion in the response message to media negotiation parameters for the first terminal.

In an implementation, when the first terminal and the second terminal belong to different service platform media modules, the call request initiated by the first terminal is forwarded to the second terminal through the service platform media module to which the second terminal belongs.

In an implementation, the method further includes:

sending one or a combination of negotiation parameters of the bootstrap data channel to the second terminal to complete a negotiation for the bootstrap data channel with the second terminal, in which the negotiation parameters include:

a negotiation parameter of the bootstrap data channel carried in a first terminal call request message;

a negotiation parameter of the bootstrap data channel carried in an independent request message sent by the first terminal; and a negotiation parameter of the bootstrap data channel carried by the second terminal in a request message, after the first terminal and the second terminal complete a call initial media negotiation.

In an implementation, a network AS initiates the process of establishing the bootstrap data channel with the service platform media module triggered by the first terminal through the dialing event.

A call request event initiated by a first terminal notified by the network AS is received.

The bootstrap data channel between the service platform media module and the first terminal is established by the network AS, and/or the bootstrap data channel between the service platform media module and the second terminal is established by the network AS.

A response message corresponding to a media negotiation result of the first terminal and/or a media negotiation result of the second terminal is returned to the network AS.

In an implementation, the method further includes:

establishing a data channel with the first terminal, and/or establishing a data channel with the second terminal by the network AS.

In an implementation, a notification message sent by the network AS is received. The notification message is sent by a VoIMS network AS or a VoLTE network AS, and used to obtain negotiation parameters.

In an implementation, the service platform media module returns a response message instructing to implement an interface display and/or a service logic of a service, and obtains service description information from the response message. The service description information includes:

bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of a user; or, the service application description information, in which the first terminal implements an interface display and/or a service logic of a service application based on the application description information.

In an implementation, the data channel is a Data Channel and/or a WebSocket channel.

In FIG. 13, a bus architecture may include any number of interconnected buses and bridges, which are specifically linked together by one or more processors represented by the processor 1300 and various circuits of a memory represented by the memory 1320. The bus architecture may also link together various other circuits, such as a peripheral device, a voltage regulator, and a power management circuit, etc., which are well known in the art, and therefore are not further described herein. A bus interface provides an interface. The transceiver 1310 may be more than one element, i.e., includes a transmitter and a receiver, and provides units for communicating with other various devices on a transmission medium. The processor 1300 is responsible for managing the bus architecture and general processing. The memory 1320 may store data used by the processor 1300 when performing operations.

A service platform media module is further provided in an embodiment of the present disclosure, and includes:

a receiving module of the service platform media module, configured to initiate a process of establishing a bootstrap data channel with a service platform media module triggered by a first terminal through a dialing event;

a bootstrap channel module of the service platform media module, configured to establish a bootstrap data channel between the service platform media module and the first terminal and a bootstrap data channel between the service platform media module and a second terminal;

a responding module of the service platform media module, configured to receive a service request message sent through the bootstrap data channel after the bootstrap data channel is successfully established; and return a response message for the service request message, in which the response message is used for the first terminal and the second terminal to implement an interface display and/or a service logic of a service based on an indication of the response message.

In the implementation, the service platform media module initiates the process of establishing the bootstrap data channel with the service platform media module triggered by the first terminal through the dialing event.

The bootstrap channel module of the service platform media module is further configured to establish the bootstrap data channel with the first terminal, and/or establish the bootstrap data channel between the service platform media module and the second terminal.

The responding module of the service platform media module is further configured to return response messages corresponding to media negotiation result of the first terminal and/or media negotiation result of the second terminal respectively.

In an implementation, the bootstrap channel module of the service platform media module is further configured to establish a data channel with the first terminal, and/or establish a data channel with the second terminal.

In an implementation, the receiving module of the service platform media module is configured to, if a data channel capability tag is carried when the second terminal performs a registration, forward a call request initiated by the first terminal to the second terminal, in which media negotiation parameters for the second terminal carried in the call request or an independent message are used as media negotiation parameters of the bootstrap data channel.

In an implementation, the receiving module of the service platform media module is configured to, if the data channel capability tag is not carried when the second terminal performs a registration, forward a call request message initiated by the first terminal to the second terminal, and delete the media negotiation parameters of the bootstrap data channel.

In an implementation, the receiving module of the service platform media module is configured to modify media response information of a bootstrap data channel portion in the response message returned by the second terminal to media response information for the first terminal, and forward a modified response message returned by the second terminal to the first terminal.

In an implementation, the responding module of the service platform media module is configured to forward a response message returned by the second terminal to the first terminal, and modify media response information of the bootstrap data channel portion in the response message to media response information for the first terminal.

In an implementation, the receiving module of the service platform media module further is configured to forward the call request initiated by the first terminal to the second terminal through the service platform media module to which the second terminal belongs when the first terminal and the second terminal belong to different service platform media modules.

In an implementation, the bootstrap channel module of the service platform media module is further configured to:

send one or a combination of negotiation parameters of the bootstrap data channel to the second terminal to complete a negotiation for the bootstrap data channel with the second terminal, in which the negotiation parameters include:

a negotiation parameter of the bootstrap data channel carried in a first terminal call request message;

a negotiation parameter of the bootstrap data channel carried in an independent request message sent by the first terminal;

a negotiation parameter of the bootstrap data channel carried by the second terminal in a request message, after the first terminal and the second terminal complete a call initial media negotiation.

In an implementation, a network AS initiates the process of establishing the bootstrap data channel with the service platform media module triggered by the first terminal through the dialing event.

The receiving module of the service platform media module is further configured to receive a call request event initiated by the first terminal and notified by the network AS.

The bootstrap channel module of the service platform media module is further configured to establish the bootstrap data channel between the service platform media module and the first terminal through the network AS, and/or establish the bootstrap data channel between the service platform media module and a second terminal through the network AS.

The responding module of the service platform media module is further configured to return a response message corresponding to a media negotiation result of the first terminal and/or a media negotiation result of the second terminal to the network AS.

In an implementation, the bootstrap channel module of the service platform media module is further configured to establish a data channel with the first terminal, and/or establish a data channel with the second terminal through the network AS.

In an implementation, the receiving module of the service platform media module is further configured to receive a notification message sent by the network AS. The notification message is sent by a VoIMS network AS or a VoLTE network AS, and used to obtain the negotiation parameters.

In an implementation, the responding module of the service platform media module is further configured to return a response message instructing to implement an interface display and/or a service logic of a service, and obtain service description information from the response message. The service description information includes:

bootstrap service description information, in which the first terminal implements a service logic of a bootstrap service based on the bootstrap service description information, and further obtains service application list description information or service application description information; or, the service application list description information, in which the first terminal implements an interface display and/or a service logic of a service application list based on the service application list description information, and further obtains the service application description information based on a selection of a user; or, the service application description information, in which the first terminal implements an interface display and/or a service logic of a service application based on the application description information.

In an implementation, the data channel is a Data Channel and/or a WebSocket channel.

For convenience of description, each part of the service platform media module described above is divided into various modules or units for description. The functions of the modules or units may be implemented in a same or multiple software or hardware when implementing the present disclosure.

When implementing the technical solutions provided in the embodiments of the present disclosure, the following may be implemented.

Figure 14:
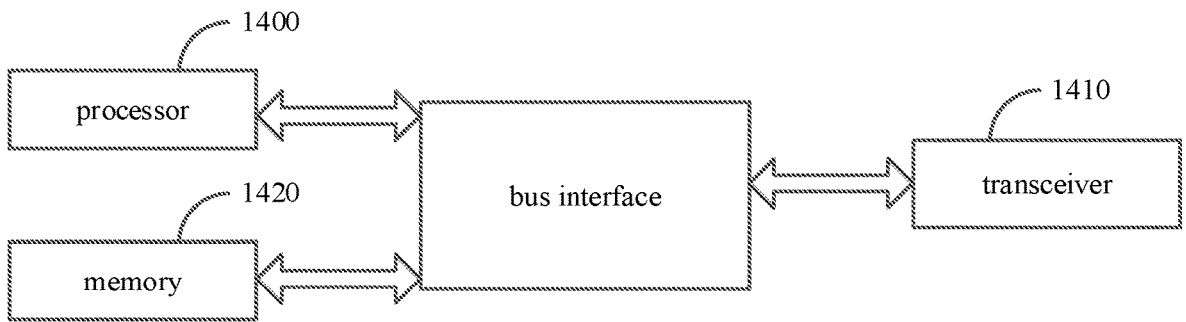
FIG. 14 is a block diagram of an AS according to an embodiment of the present disclosure.

FIG. 14 is a block diagram of a network AS, as shown in FIG. 14, the AS includes a processor 1400, a transceiver 1410 and a memory 1420.

The processor 1400 is configured to read a program in the memory 1420 and perform a method including:

receiving a first terminal call request message, in which the first terminal call request message is a call request message initiated by a first terminal; and establishing a bootstrap data channel based on the first terminal call request message, in which the bootstrap data channel is used for the first terminal to send a service request message or perform a service data interaction.

The transceiver 1410 is configured to send and receive data under a control of the processor 1400.

In an implementation, if a second terminal carries a data channel capability tag when performing a registration, the method further includes:

replacing negotiation parameters of the bootstrap data channel carried in the first terminal call request message with media negotiation parameters required by the bootstrap data channel between the service platform media module and the second terminal, and forwarding a modified first terminal call request message to the second terminal; or, forwarding the call request message initiated by the first terminal to the second terminal, replacing the negotiation parameters of the bootstrap data channel carried in an independent request message sent by the first terminal with the media negotiation parameters required by the bootstrap data channel between the service platform media module and the second terminal, and forwarding a modified independent request message sent by the first terminal to the second terminal.

In an implementation, if the second terminal does not carry the data channel capability tag when performing the registration, the method further includes:

forwarding the call request message initiated by the first terminal to the second terminal, and deleting media negotiation parameters of the bootstrap data channel in the call request message.

In an implementation, if a second terminal carries the data channel capability tag when performing the registration, the method further includes:

forwarding the call request message initiated by the first terminal to the second terminal, carrying the data channel capability tag to indicate that the second terminal is a terminal with a capability to communicate through a data channel, and media negotiation parameters for the second terminal returned by the service platform media module and used as media negotiation parameters of the bootstrap data channel.

In an implementation, if the second terminal does not carry the data channel capability tag when performing the registration, the method further includes:

forwarding the call request message initiated by the first terminal to the second terminal, and deleting the media negotiation parameters of the bootstrap data channel.

In an implementation, the method further includes:

modifying media response information of a bootstrap data channel portion in a response message returned by the second terminal to media response information for the first terminal, and forwarding a modified response message returned by the second terminal to the first terminal.

In an implementation, the method further includes:

forwarding a response message returned by the second terminal to the first terminal, and modifying media response information of the bootstrap data channel portion in the response message to media response information for the first terminal.

In an implementation, when the first terminal and the second terminal belong to different Ass, the call request initiated by the first terminal is forwarded to the second terminal through the network AS to which the second terminal belongs.

In an implementation, the method further includes:

sending one or a combination of the negotiation parameters of the bootstrap data channel to the second terminal to complete a negotiation for the bootstrap data channel with the second terminal, in which the negotiation parameters include:

a negotiation parameter of the bootstrap data channel carried in a first terminal call request message;

a negotiation parameter of the bootstrap data channel carried in the independent request message sent by the first terminal;

a negotiation parameter of the bootstrap data channel carried by the second terminal in the request message, after the first terminal and the second terminal complete a call initial media negotiation.

In an implementation, the network AS is a VoIMS network AS or a VoLTE network AS.

In an implementation, the data channel is a Data Channel and/or a WebSocket channel.

In FIG. 14, a bus architecture may include any number of interconnected buses and bridges, which are specifically linked together by one or more processors represented by the processor 1400 and various circuits of a memory represented by the memory 1420. The bus architecture may also link together various other circuits, such as a peripheral device, a voltage regulator, and a power management circuit, etc., which are well known in the art, and therefore are not further described herein. A bus interface provides an interface. The transceiver 1410 may be more than one element, i.e., includes a transmitter and a receiver, and provides units for communicating with other various devices on a transmission medium. The processor 1400 is responsible for managing the bus architecture and general processing. The memory 1420 may store data used by the processor 1400 when performing operations.

An AS is provided in an embodiment of the present disclosure, including:

a receiving module of the AS, configured to receive a first terminal call request message, in which the first terminal call request message is a call request message initiated by a first terminal; and a bootstrap channel module of the AS, configured to establish a bootstrap data channel based on the first terminal call request message, in which the bootstrap data channel is used for the first terminal to send a service request message or perform a service data interaction.

In an implementation, the bootstrap channel module of the AS is further configured to: if a second terminal carries a data channel capability tag when performing a registration, replace negotiation parameters of the bootstrap data channel carried in the first terminal call request message with media negotiation parameters required by the bootstrap data channel between the service platform media module and the second terminal, and forward a modified first terminal call request message to the second terminal; or, forward the call request message initiated by the first terminal to the second terminal, replace negotiation parameters of the bootstrap data channel carried in an independent request message sent by the first terminal with media negotiation parameters required by the bootstrap data channel between the service platform media module and the second terminal, and forward a modified independent request message sent by the first terminal to the second terminal.

In an implementation, the bootstrap channel module of the AS is further configured to: in response to the second terminal not carrying a data channel capability tag when performing a registration, forward the call request message initiated by the first terminal to the second terminal, and delete media negotiation parameters of the bootstrap data channel in the call request message.

In an implementation, the receiving module of the AS is further configured to: if the second terminal carries a data channel capability tag when performing a registration, forward the call request message initiated by the first terminal to the second terminal, carry the data channel capability tag to indicate that the second terminal is a terminal with a capability to communicate through a data channel, and media negotiation parameters for the second terminal returned by the service platform media module and used as media negotiation parameters of the bootstrap data channel.

In an implementation, the receiving module of the AS is further configured to: if the second terminal does not carry a data channel capability tag when performing the registration, forward the call request message initiated by the first terminal to the second terminal, and delete media negotiation parameters of the bootstrap data channel.

In an implementation, the receiving module of the AS is configured to modify media response information of a bootstrap data channel portion in the response message returned by the second terminal to media response information for the first terminal, and forward a modified response message returned by the second terminal to the first terminal.

In an implementation, the receiving module of the AS is further configured to forward a response message returned by the second terminal to the first terminal, and modify media response information of a bootstrap data channel portion in the response message to media response information for the first terminal.

In an implementation, the receiving module of the AS is further configured to: when the first terminal and the second terminal belong to different ASs, forward the call request initiated by the first terminal to the second terminal through the network AS to which the second terminal belongs.

In an implementation, the bootstrap channel module of the AS is further configured to send one or a combination of negotiation parameters of the bootstrap data channel to the second terminal to complete a negotiation for the bootstrap data channel with the second terminal, in which the negotiation parameters include:

a negotiation parameter of the bootstrap data channel carried in the first terminal call request message;

a negotiation parameter of the bootstrap data channel carried in the independent request message sent by the first terminal;

a negotiation parameter of the bootstrap data channel carried by the second terminal in a request message, after the first terminal and the second terminal complete a call initial media negotiation.

In an implementation, the network AS is a VoIMS network AS or a VoLTE network AS.

In an implementation, the data channel is a Data Channel and/or a WebSocket channel.

For convenience of description, each part of the service platform media module described above is divided into various modules or units for description. The functions of the modules or units may be implemented in a same or multiple software or hardware when implementing the present disclosure.

The embodiments of the present disclosure further provide a computer-readable storage medium. The computer-readable storage medium stores a computer program for executing the communication method or the method for establishing a data channel.

The specific implementation may refer to the implementations of the communication method of one or a combination of a calling terminal, a called terminal and a service platform media module, and/or an implementation of a method for establishing a data channel on an AS side.

In summary, the embodiments of the present disclosure provide a solution for a terminal to establish an enhanced call service bootstrap channel, and provides a specific implementation manner of the data channel technology and an end-to-end process.

Those skilled in the art should understand that the embodiments of the present disclosure may be provided as a method, a system, or a computer program product. Thus, the present disclosure may take the form of an entirely hardware embodiment, an entirely software embodiment, or embodiments incorporating software and hardware aspects. Moreover, the present disclosure may take the form of a computer program product implemented on one or more computer-readable storage media (including but not limited to a disk memory and an optical memory, etc.) including computer-usable program code.

The present disclosure is described according to a flow-chart and/or block diagram of a method, a device (system), and a computer program product according to the embodiments of the present disclosure. It should be understood that each process and/or block in the flowchart and/or a block diagram, and a combination of a process and/or block in in the flowchart and/or a block diagram may be implemented by computer program instructions. These computer program instructions may be provided to a processor of a general purpose computer, special purpose computer, embedded processor, or other programmable data processing device to generate a machine, such that when instructions are executed by the processor of the computer or other programmable data processing device, an apparatus for implementing a function specified in one or more processes in the flowchart and/or one or more blocks in the block diagram is generated.

These computer program instructions may also be stored in a computer-readable memory that can direct a computer or other programmable data processing device to work in a particular manner such that the instructions stored in the computer-readable memory produce a product that includes an instruction device that is implemented a function specified in one or more processes in the flowchart and/or one or more blocks in the block diagram.

These computer program instructions may also be loaded to a computer or other programmable data processing device such that a series of operational steps are performed on a computer or other programmable device to produce a computer-implemented process, such that instructions executed on a computer or other programmable device provide for implementation steps specified in one or more processes in the flowchart and/or one or more blocks in the block diagram.

It may be understood that these embodiments described in the present disclosure may be implemented by hardware, software, firmware, middleware, microcode, or a combination thereof. For hardware implementations, modules, units, sub-modules, subunits, etc., may be implemented in one or more Application Specific Integrated Circuits (ASICs), Digital Signal Processing (DSP), Digital Signal Processing Devices (DSP Device, DSPDs), Programmable Logic Devices (PLDs), Field-Programmable Gate Arrays (FP-GAs), general-purpose processors, controllers, microcontrollers, microprocessors, other electronic units for performing the functions of the present disclosure, or a combination thereof.

Obviously, those skilled in the art may make various modifications and variations to the present disclosure without departing from the spirit and scope of the present disclosure. Thus, if these modifications and variations of the present disclosure fall within the scope of the claims and their equivalents, the present disclosure is also intended to encompass these modifications and variations.

What is claimed is:

1. A communication method, comprising:

monitoring, by a first terminal, a dialing event, triggering a process of establishing a bootstrap data channel with a service platform media module through the dialing event;

after the bootstrap data channel with the service platform media module is successfully established, sending, by the first terminal, a service request message through the bootstrap data channel; and receiving, by the first terminal, a response message for the service request message returned by the service platform media module, and implementing a service logic of a service based on an indication of the response message;

wherein implementing the service logic of the service based on the indication of the response message comprises:

obtaining service description information from the response message, wherein the service description information comprises:

bootstrap service description information, wherein the first terminal implements the service logic of a bootstrap service based on the bootstrap service description information, and further obtains service application list description information or service application description information; or the service application list description information, wherein the first terminal implements the service logic of a service application list based on the service application list description information, and further obtains the service application description information based on a selection of a user; or the service application description information, wherein the first terminal implements the service logic of a service application based on the service application description information.

2. The communication method of claim 1, wherein establishment of the bootstrap data channel is initiated by the first terminal.

3. The communication method of claim 2, wherein negotiation request information of the bootstrap data channel is carried by the first terminal in a call request message, the call request message is initiated to a second terminal by the first terminal after the dialing event is monitored by the first terminal, or is independently sent by the first terminal using an independent message.

4. The communication method of claim 1, further comprising:

carrying a data channel capability tag when a call request is initiated, to indicate that the first terminal is a terminal with a capability to communicate through a data channel.

5. The communication method of claim 1, further comprising:

carrying a data channel capability tag when the first terminal performs a registration, to indicate that the first terminal is a terminal with a capability to communicate through a data channel.

6. The communication method of claim 1, further comprising at least one of:

establishing, by the first terminal, the bootstrap data channel with the service platform media module through a voice over internet protocol multimedia subsystem (VoIMS) network application server (AS) or a voice over long-term evolution (VoLTE) network AS; or, establishing, by the first terminal, the bootstrap data channel with the service platform media module through the service platform media module.

7. A communication method, comprising:

receiving, by a second terminal, a call request message sent by a first terminal, and triggering a process of establishing a bootstrap data channel with a service platform media module based on the call request message or a received independent request message sent by the first terminal;

after the bootstrap data channel with the service platform media module is successfully established, sending, by the second terminal, a service request message to the service platform media module through the bootstrap data channel; and receiving, by the second terminal, a response message for the service request message returned by the service platform media module, and implementing a service logic of a service based on an indication of the response message;

wherein implementing the service logic of the service based on the indication of the response message comprises:

obtaining service description information from the response message, wherein the service description information comprises:

bootstrap service description information, wherein the first terminal implements the service logic of a bootstrap service based on the bootstrap service description information, and further obtains service application list description information or service application description information; or, the service application list description information, wherein the first terminal implements the service logic of a service application list based on the service application list description information, and further obtains the service application description information based on a selection of a user; or, the service application description information, wherein the first terminal implements the service logic of the service application based on the application description information.

8. The communication method of claim 7, further comprising at least one of:

establishing, by the second terminal, the bootstrap data channel with the service platform media module through a voice over internet protocol multimedia subsystem (VoIMS) network application server (AS) or a voice over long-term evolution (VoLTE) network AS; or, establishing, by the second terminal, the bootstrap data channel with the service platform media module through the service platform media module.

9. The communication method of claim 7, further comprising:

receiving, by the second terminal, one or a combination of negotiation parameters of the bootstrap data channel to complete a negotiation for the bootstrap data channel with the second terminal, wherein the negotiation parameters comprise:

a negotiation parameter of the bootstrap data channel carried in a first terminal call request message;

a negotiation parameter of the bootstrap data channel carried in an independent request message sent by the first terminal;

a negotiation parameter of the bootstrap data channel carried by the second terminal in a request message, after the first terminal and the second terminal complete a call initial media negotiation.

10. A communication method, comprising:

initiating a process of establishing a first bootstrap data channel with a service platform media module triggered by a first terminal through a dialing event;

establishing the first bootstrap data channel between the service platform media module and the first terminal and a second bootstrap data channel between the service platform media module and a second terminal;

after bootstrap data channels are successfully established, receiving a service request message sent through at least one of the first bootstrap data channel or the second bootstrap data channel; and returning a response message for the service request message, wherein the response message is used for at least one of the first terminal or a second terminal to implement a service logic of a service based on an indication of the response message;

wherein the service platform media module provides the response message instructing to implement the service logic of the service to the at least one of the first terminal or the second terminal through at least one of the first bootstrap data channel or the second bootstrap data channel, and wherein the at least one of the first terminal or the second terminal obtains service description information from the response message; the service description information comprises:

bootstrap service description information, wherein the first terminal implements the service logic of a bootstrap service based on the bootstrap service description information, and the at least one of the first terminal or the second terminal further obtains service application list description information or service application description information; or, the service application list description information, wherein the first terminal implements the service logic of a service application list based on the service application list description information, and the at least one of the first terminal or the second terminal further obtains the service application description information based on a selection of a user; or, the service application description information, wherein the at least one of the first terminal or the second terminal implements the service logic of a service application based on the service application description information.

11. The communication method of claim 10, wherein the service platform media module initiates the process of establishing the first bootstrap data channel with the service platform media module triggered by the first terminal through the dialing event;

the service platform media module establishes at least one of the first bootstrap data channel with the first terminal or the second bootstrap data channel with the second terminal; and the service platform media module returns the response message corresponding to at least one of a media negotiation result of the first terminal or a media negotiation result of the second terminal.

12. The communication method of claim 10, further comprising at least one of:

establishing a data channel with the first terminal or establishing a data channel with the second terminal.

13. The communication method of claim 10, wherein in response to the second terminal carrying a data channel capability tag when performing a registration, the method further comprises:

forwarding a call request initiated by the first terminal to the second terminal, wherein media negotiation parameters for the second terminal carried in the call request or an independent message are used as media negotiation parameters of the second bootstrap data channel.

14. The communication method of claim 10, wherein in response to the second terminal not carrying a data channel capability tag when performing a registration, the method further comprises:

forwarding a call request message initiated by the first terminal to the second terminal, and deleting media negotiation parameters of the first bootstrap data channel.

15. The communication method of claim 10, wherein in response to the first terminal and the second terminal belonging to different service platform media modules, a call request initiated by the first terminal is forwarded to the second terminal through a second service platform media module to which the second terminal belongs.

16. The communication method of claim 10, further comprising:

sending one or a combination of negotiation parameters of the first bootstrap data channel to the second terminal to complete a negotiation for the second bootstrap data channel with the second terminal, wherein the negotiation parameters comprise:

a negotiation parameter of the first bootstrap data channel carried in a first terminal call request message;

a negotiation parameter of the first bootstrap data channel carried in an independent request message sent by the first terminal; and a negotiation parameter of the second bootstrap data channel carried by the second terminal in a request message, after the first terminal and the second terminal complete a call initial media negotiation.

17. The communication method of claim 10, wherein at least one of: the first bootstrap data channel between the service platform media module and the first terminal, or the second bootstrap data channel between the service platform media module and the second terminal is established by a network application server (AS); and the service platform media module returns the response message corresponding to at least one of a media negotiation result of the first terminal or a media negotiation result of the second terminal to the network AS.

18. The communication method of claim 10, further comprising at least one of:

establishing a data channel with the first terminal or establishing a data channel with the second terminal through the network AS.

19. The communication method of claim 10, wherein the service platform media module receives a notification message sent by a network AS; wherein the notification message is sent by a voice over internet protocol multimedia subsystem (VoIMS) network AS or a voice over long-term evolution (VoLTE) network AS, and used to obtain negotiation parameters.

* * * * *